US012069427B2

(12) United States Patent
Ye et al.

(10) Patent No.: US 12,069,427 B2
(45) Date of Patent: Aug. 20, 2024

(54) SOUND GENERATOR, SOUND APPARATUS AND APPARATUS COMPRISING THE SAME

(71) Applicant: LG DISPLAY CO., LTD., Seoul (KR)

(72) Inventors: Jaehun Ye, Tokyo (JP); Takayuki Suzuki, Tokyo (JP)

(73) Assignee: LG DISPLAY CO., LTD., Seoul (KR)

(*) Notice: Subject to any disclaimer, the term of this patent is extended or adjusted under 35 U.S.C. 154(b) by 273 days.

(21) Appl. No.: 17/566,158

(22) Filed: Dec. 30, 2021

(65) Prior Publication Data

US 2022/0217472 A1 Jul. 7, 2022

(30) Foreign Application Priority Data

Jan. 6, 2021 (JP) ................................ 2021-000698

(51) Int. Cl.
*H04R 17/00* (2006.01)

(52) U.S. Cl.
CPC .................................. *H04R 17/00* (2013.01)

(58) Field of Classification Search
CPC ...... H04R 17/00; H04R 17/005; H04R 17/06; H04R 17/08
See application file for complete search history.

(56) References Cited

U.S. PATENT DOCUMENTS

| | | | | |
|---|---|---|---|---|
| 3,697,790 A * | 10/1972 | Flint | H04R 17/00 310/359 |
| 5,607,535 A * | 3/1997 | Tsukada | H10N 30/053 29/25.35 |
| 6,069,433 A * | 5/2000 | Lazarus | G03F 7/70725 310/333 |
| 11,212,622 B2 * | 12/2021 | Chen | H10N 30/875 |
| 11,548,030 B2 * | 1/2023 | Ohta | H03H 9/17 |

FOREIGN PATENT DOCUMENTS

| | | |
|---|---|---|
| JP | 54-038490 B2 | 11/1979 |
| JP | H07-213997 A | 8/1995 |
| JP | 2004-104327 A | 4/2004 |
| JP | 2008-125005 A | 5/2008 |
| JP | 2013-093817 A | 5/2013 |
| JP | 2019-146108 A | 8/2019 |
| KR | 2012-0017384 A | 2/2012 |
| KR | 2013-0127342 A | 11/2013 |
| KR | 2015-0127523 A | 11/2015 |
| KR | 2018-0077582 A | 7/2018 |

OTHER PUBLICATIONS

Korean Office Action dated Oct. 27, 2023 issued in Patent Application No. 10-2021-0188890 (11 pages).
Japanese Office Action dated Apr. 11, 2023 issued in Patent Application No. 2022-042159 (4 pages).

* cited by examiner

*Primary Examiner* — Ryan Robinson
(74) *Attorney, Agent, or Firm* — POLSINELLI PC

(57) ABSTRACT

A sound generator includes a vibration plate, a vibration portion including a first vibration device and a second vibration device disposed at a rear surface of the vibration plate to intersect with each other, and a connection portion connected between the vibration plate and the vibration portion, wherein each of the first vibration device and the second vibration device includes a plurality of piezoelectric layers and a common electrode disposed between the plurality of piezoelectric layers and including at least one weight member.

16 Claims, 24 Drawing Sheets

SOUND GENERATOR, SOUND APPARATUS AND APPARATUS COMPRISING THE SAME

CROSS-REFERENCE TO RELATED APPLICATION

This application claims the priority of the Japanese Patent Application No. 2021-000698 filed on Jan. 6, 2021, which is hereby incorporated by reference in its entirety.

BACKGROUND

Field of the Disclosure

The present disclosure relates to a sound generator, a sound apparatus and an apparatus comprising the same.

Description of the Background

Recently, display apparatuses having improved sound performance for enhancing a sense of realism have been developed, and technology for enabling a display panel to function as a speaker has been developed.

As examples, Korean Patent Publication No. 10-2018-0077582 discloses a display apparatus including a display panel and an actuator. Such a display apparatus may be referred to as a display enabling sound apparatus which controls the actuator to vibrate the display panel to generate a sound.

Nonetheless, the display apparatus disclosed in Korean Patent Publication No. 10-2018-0077582 still needs improvement in sound quality.

SUMMARY

Accordingly, the present disclosure is directed to providing a sound generator and a sound apparatus that substantially obviate one or more problems due to limitations and disadvantages described above.

The present disclosure is to provide a sound generator, a sound apparatus and an apparatus comprising the same, which have enhanced sound quality.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other aspects of the present disclosure, as embodied and broadly described, a sound apparatus comprises a vibration plate; a vibration portion including a first vibration device and a second vibration device disposed at a rear surface of the vibration plate to intersect with each other; and a connection portion connected between the vibration plate and the vibration portion, each of the first vibration device and the second vibration device comprises a plurality of piezoelectric layers; and a common electrode disposed between the plurality of piezoelectric layers and including at least one weight member.

In another aspect, a sound apparatus comprises a first cover, a second cover, and a sound generator disposed between the first cover and the second cover, the sound generator comprises a vibration portion including a first vibration device and a second vibration device disposed to intersect with each other; and a connection portion connected between the vibration portion and each of the first cover and the second cover, and each of the first vibration device and the second vibration device comprises a plurality of piezoelectric layers; and a common electrode disposed between the plurality of piezoelectric layers, the common electrode including at least one weight member.

In another aspect, an apparatus comprises a vibration member; a vibration apparatus connected to the vibration member; and a case connected to the vibration member to surround the sound apparatus, the vibration apparatus comprises a sound generator, the sound apparatus comprises a vibration plate; a vibration portion including a first vibration device and a second vibration device disposed at a rear surface of the vibration plate to intersect with each other; and a connection portion connected between the vibration plate and the vibration portion, each of the first vibration device and the second vibration device comprises a plurality of piezoelectric layers; and a common electrode disposed between the plurality of piezoelectric layers and including at least one weight member.

According to the aspects of the present disclosure, a sound generator and a sound apparatus with enhanced sound quality may be provided, and an apparatus comprising the same.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the disclosure and are incorporated in and constitute a part of the present disclosure, illustrate aspects of the disclosure and together with the description serve to explain the principle of the disclosure.

In the drawings.

Figure 1:
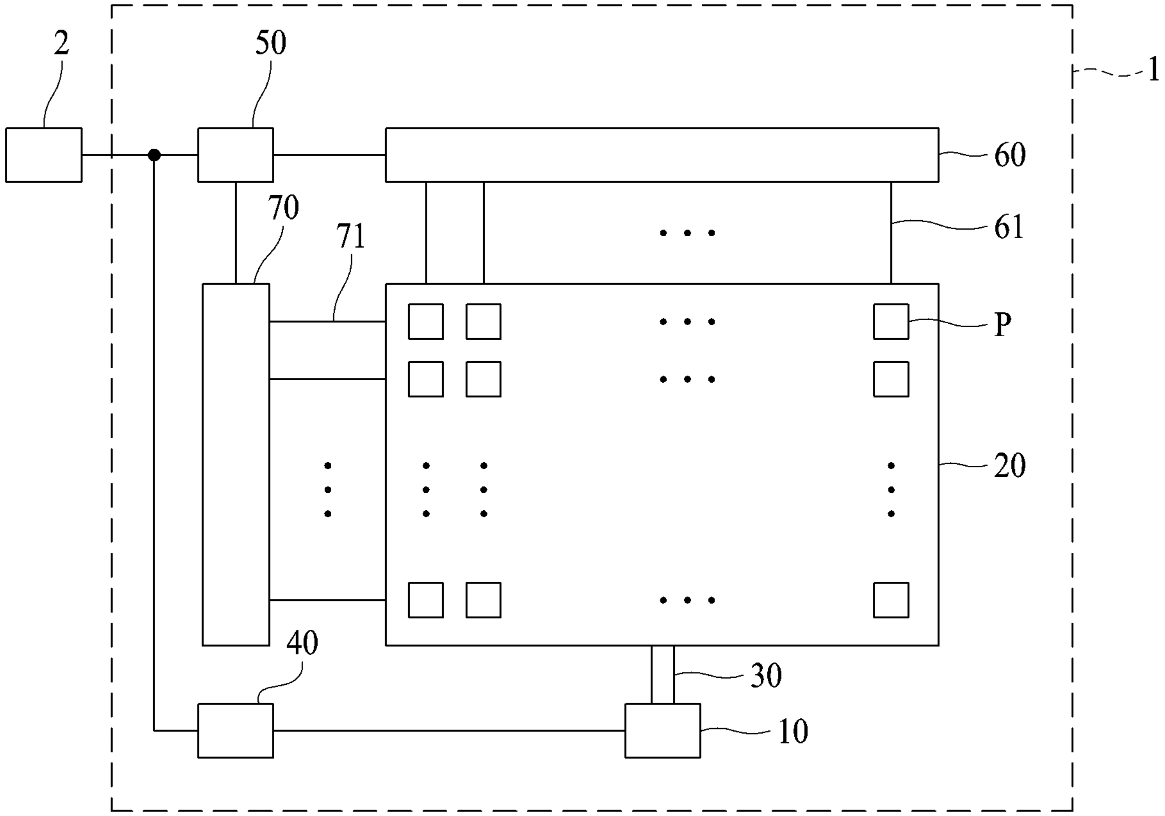
FIG. 1 illustrates a display apparatus according to a related art.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to aspects of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Furthermore, the present disclosure is only defined by scopes of claims.

The shape, a size, a ratio, an angle, and a number disclosed in the drawings for describing aspects of the present disclosure are merely an example, and thus, the aspects of present disclosure are not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

In the description of aspects, when a structure is described as being positioned "on or above" or "under or below" another structure, this description should be construed as including a case in which the structures contact each other as well as a case in which a third structure is disposed therebetween.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

A size and a thickness of each component illustrated in the drawing are illustrated for convenience of description, and the present disclosure is not limited to the size and the thickness of the component illustrated.

Features of various aspects of the present disclosure may be partially or overall coupled to or combined with each other, and may be variously inter-operated with each other and driven technically as those skilled in the art can sufficiently understand. Aspects of the present disclosure may be carried out independently from each other, or may be carried out together in co-dependent relationship.

Hereinafter, aspects of the present disclosure will be described in detail with reference to the accompanying drawings. In the drawings, like reference numerals refer to like elements having a common function, and repeated descriptions are omitted or will be briefly given. For convenience of description, a scale of each of elements illustrated in the accompanying drawings differs from a real scale, and thus, is not limited to a scale illustrated in the drawings.

A Related Art

FIG. 1 is a diagram schematically illustrating a display apparatus 1 according to a related art.

The display apparatus 1 may be electronic posters, digital bulletin boards, electronic advertisement signboards, computer image output devices, televisions, smart phones, or game machines, or the like, but aspects of the present disclosure are not limited thereto.

As illustrated in FIG. 1, the display apparatus 1 may include a piezoelectric device 10, a display panel 20, an elastic member 30, a first controller 40, a second controller 50, a data driving circuit 60, and a gate driving circuit 70. The display apparatus 1 may be an apparatus which displays an image by a display panel 20 based on RGB data or the like input thereto and generates a sound or a vibration based on a sound signal (or a vibration driving signal) or the like input thereto. Thus, the display apparatus 1 may be implemented as a sound apparatus.

The display panel 20 may include the plurality of pixels P arranged in a matrix. The pixel P may include a light emitting device including an organic light emitting diode or the like. When the display apparatus 1 is capable of displaying a color image, the pixel P may be a subpixel which displays one of a plurality of colors (for example, RGB) implementing a color image.

The piezoelectric device 10 may be an element where displacement occurs due to an inverse piezoelectric effect when a voltage is applied based on a sound signal input thereto. The piezoelectric device 10 may be an element where bent displacement occurs due to a voltage such as bimorph and unimorph. Because an input sound signal is an alternating current (AC) voltage, the piezoelectric device 10 may act as a vibration device which vibrates according to a sound signal input thereto.

The elastic member 30 may be a member configured by a material having elasticity. A material of the elastic member 30 may have an elastic modulus which is lower than the piezoelectric device 10 and the display panel 20, and may be, for example, a material such as rubber or the like. A portion of the piezoelectric device 10 may be connected to a portion of the display panel 20 by the elastic member 30, and thus, a vibration of the piezoelectric device 10 may be transferred to the display panel 20, and the display panel 20 may generate a sound based on a sound signal input thereto.

A host system 2 may be a system including an apparatus or a plurality of apparatuses, which provide(s) an image signal such as RGB data or the like, a sound signal, and a timing signal to control the display apparatus 1. The timing signal may include a vertical synchronization signal, a horizontal synchronization signal, and a data enable signal, or the like. The host system 2 may be, for example, a source sound reproduction apparatus, a local broadcast apparatus, a radio broadcast reproduction system, a television (TV) system, a set-top box, a navigation system, an optical disk player, a computer, a home theater system, and a video phone system, or the like. Also, the display apparatus 1 and the host system 2 may be an integrated apparatus, or may be configured as separate apparatuses.

The first controller 40 may provide a voltage to the piezoelectric device 10 based on a sound signal and a timing signal input from the host system 2. The second controller 50 may control the data driving circuit 60 and the gate driving circuit 70 based on image data and a timing signal input from the host system 2. The data driving circuit 60 may supply data voltages or the like to a plurality of pixels P through a driving line 61 disposed at each column of the plurality of pixels P. The gate driving circuit 70 may supply a control signal to the plurality of pixels P through a driving line 71 disposed at each row of the plurality of pixels P. Also, each of the driving line 61 and the driving line 71 may be provided in a plurality lines (or wiring lines).

Each of the first controller 40, the second controller 50, the data driving circuit 60, and the gate driving circuit 70 may be configured by one semiconductor IC or a plurality of semiconductor ICs. Also, some or all of the first controller 40, the second controller 50, the data driving circuit 60, and the gate driving circuit 70 may be configured as one semiconductor IC or one body (or a single body).

Figure 2:
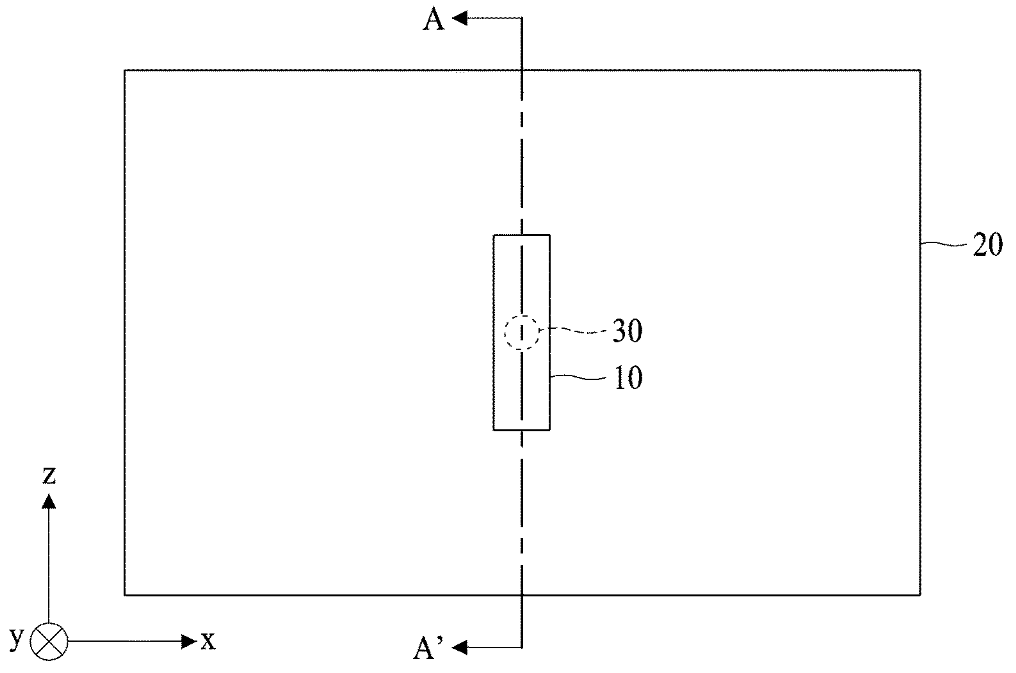
FIG. 2 is a plan view illustrating a schematic configuration of piezoelectric device according to a related art.
Figure 3:
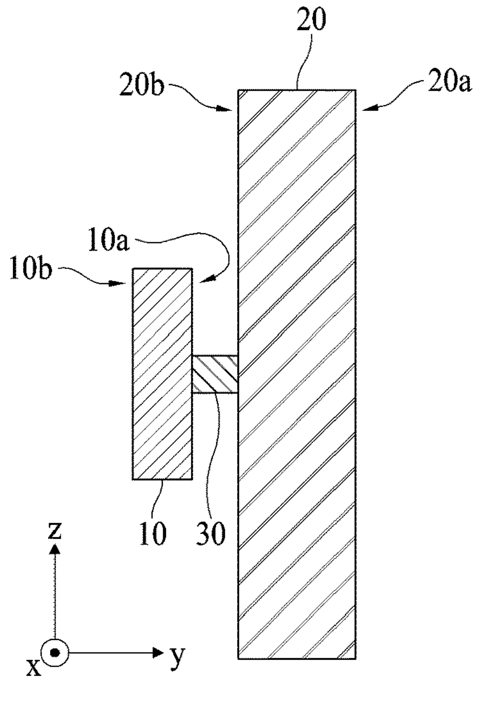
FIG. 3 is a cross-sectional view taken along line A-A' illustrated in FIG. 2.

FIG. 2 is a plan view illustrating a schematic configuration of piezoelectric devices 10 according to a related art. FIG. 3 is a cross-sectional views taken along line A-A' illustrated in FIG. 2. In FIG. 2, an external frame of a tetragonal (or a rectangular) border (or boundary) of a display panel 20 schematically illustrates an external appearance or an external shape of the display panel 20.

One main surface of the display panel 20 illustrated in FIG. 3 may be an image display surface (or a first surface or a front surface) 20*a*, and the other main surface may be a rear surface (or a second surface or a backside surface) 20*b*. In coordinate axes illustrated in FIGS. 2 and 3, a horizontal direction of the image display surface 20*a* illustrates an x axis, a vertical direction of the image display surface 20*a* illustrates a z axis, and a depth direction of the image display surface 20*a* illustrates a y axis. Also, a direction from the rear surface 20*b* to the image display surface 20*a* may be a forward direction of the y-axis.

The shape of the piezoelectric device 10 may be a rectangular shape having a long-side direction (a z direction in FIGS. 2 and 3) and a short-side direction (an x direction in FIGS. 2 and 3) with respect to a plan view, and may be a flat plate shape. Accordingly, deformation which is bent to a cross-sectional surface (line A-A') in the long-side direction may occur. A long-side direction of the piezoelectric device 10 may be disposed to be perpendicular to an end portion of the display panel 20.

An elastic member 30 may be connected (or coupled) to a portion including a center of the piezoelectric device 10 in the long-side direction thereof. The center of the piezoelectric device 10 in the long-side direction thereof may be a portion which is an antinode of a vibration, and thus, a vibration may be efficiently transferred to the display panel 20.

The piezoelectric device 10 illustrated in FIG. 3 may include a main surface (or a first surface) 10*a* and a second main surface (or a second surface) 10*b*. The elastic member 30 may connect (or couple) the first surface 10*a* of the piezoelectric device 10 to a rear surface 20*b* of the display panel 20. As described above, the piezoelectric device 10 and the elastic member 30 may be disposed at the rear surface 20*b* of the display panel 20 so as not to obstruction with image display of the image display surface 20*a*.

The elastic member 30 may be connected (or coupled) to only a portion of the first surface 10*a* of the piezoelectric device 10. Therefore, both end portions of the piezoelectric device 10 in a long-side direction thereof may be in a lifted state, and thus, it may be suppressed the vibration of the piezoelectric device 10 at the both end portions, where a displacement of a bending vibration (or flexural vibration) is large of the piezoelectric device 10 in the long-side direction thereof.

Figure 4:
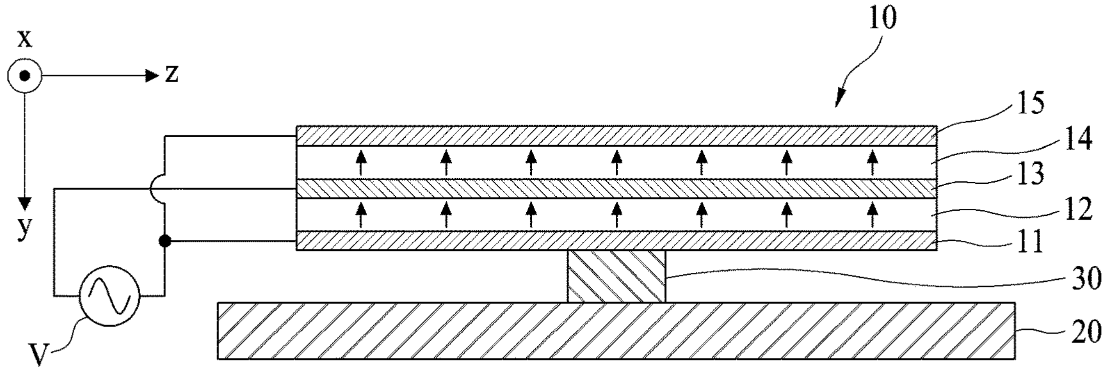
FIG. 4 is a cross-sectional view illustrating in more detail a structure of a piezoelectric device according to a related art.

FIG. 4 is a cross-sectional view illustrating in more detail a structure of a piezoelectric device 10 according to a related art. FIG. 4 is a cross-sectional view taken along line A-A' illustrated in FIG. 2 like FIG. 3 although a direction in which FIG. 3 is rotated 90 degrees to the right. Also, FIG. 4 schematically illustrates, by a circuit diagram, a connection relationship between electrodes included at the piezoelectric device 10, for describing a method of inputting a sound signal to the piezoelectric device 10.

A structure of the piezoelectric device 10 illustrated in FIG. 4 may include a bimorph structure where two piezoelectric layers are stacked.

The piezoelectric device 10 illustrated in FIG. 4 may include a first electrode 11, a first piezoelectric layer 12, a second electrode 13, a second piezoelectric layer 14, and a third electrode 15. The first electrode 11 may be disposed closest to the display panel 20 and may be connected to the elastic member 30. The third electrode 15 may be disposed farthest from the display panel 20. The second electrode 13 may be disposed between the first electrode 11 and the third electrode 15.

The first piezoelectric layer 12 may be supported between the first electrode 11 and the second electrode 13. The second piezoelectric layer 14 may be supported between the second electrode 13 and the third electrode 15. Arrows represented inside the first piezoelectric layer 12 and the second piezoelectric layer 14 represent polarization directions, and the polarization direction of the first piezoelectric layer 12 may be the same as the polarization direction of the second piezoelectric layer 14.

Also, a line (or wiring line) to apply a voltage to each electrode may be connected to the first electrode 11, the second electrode 13, and the third electrode 15, but in FIG. 4, the illustration of the line is omitted. Also, a connection of the line may be performed by soldering or the like, but aspects of present disclosure are not limited to a specific method.

A voltage applied to the piezoelectric device 10 may be based on a sound signal, and thus, may be an AC voltage corresponding to a frequency of a sound which is to be generated. In FIG. 4, the AC voltage is represented by a circuit sign for an AC power. In the AC power V, one terminal (or a first terminal) may be connected to the first and third electrodes 11 and 15, and the other terminal (or a second terminal) may be connected to the second electrode 13. That is, the voltage applied to the first electrode 11 and the voltage applied to the third electrode 15 may be the same phase (or in-phase), the voltage applied to the first electrode 11 and the voltage applied to the second electrode 13 may be opposite phases (or anti-phases), and the voltage applied to the second electrode 13 and the voltage applied to the third electrode 15 may be the opposite phase (or anti-phase). Accordingly, the voltage applied to the first piezoelectric layer 12 and the voltage applied to the second piezoelectric layer 14 may be in opposite phases (or anti-phases).

Materials of the first and second piezoelectric layers 12 and 14 may be a piezoelectricity material, and aspects of present disclosure are not limited to a specific material. For example, the first and second piezoelectric layers 12 and 14 may include lead zirconate titanate (PZT) or the like. The PZT have high piezoelectricity, and thus, may have a large displacement amount with respect to the applied voltage.

Also, although not illustrated in FIG. 4, an outer periphery (or an outer perimeter) of the piezoelectric device 10 may be covered by an insulator such as resin or the like so as to prevent an electrical short circuit between the piezoelectric device 10 and another member.

Figure 5:
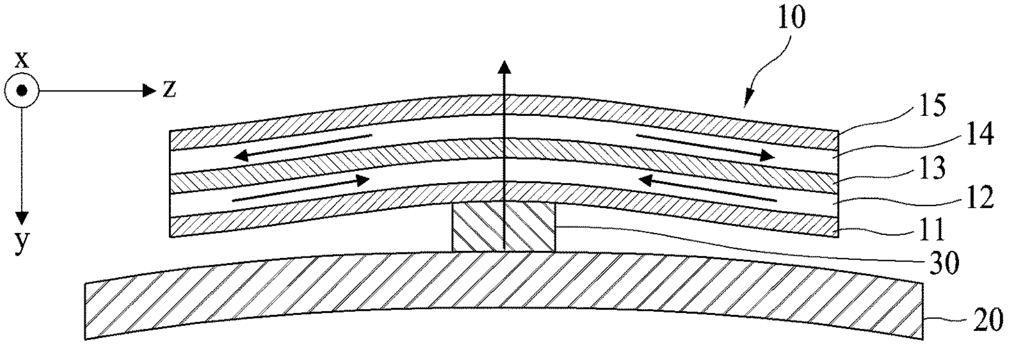
FIG. 5 is a schematic diagram illustrating a deformation contracted in a horizontal direction when a voltage is applied to the piezoelectric device in the related art.
Figure 6:
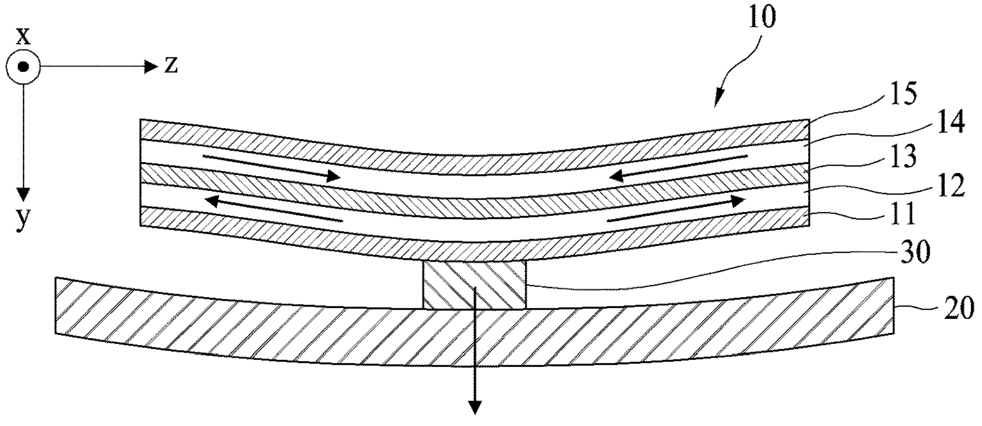
FIG. 6 is a schematic diagram illustrating a deformation expanded in a horizontal direction when a voltage is applied to the piezoelectric device in the related art.

FIG. 5 is schematic diagram illustrating a deformation contracted in a horizontal direction when a voltage is applied to the piezoelectric device 10 in the related art. FIG. 6 is schematic diagram illustrating a deformation expanded in a horizontal direction when a voltage is applied to the piezoelectric device 10 in the related art. As illustrated in FIG. 4, the polarization direction of the first piezoelectric layer 12 may be the same as the polarization direction of the second piezoelectric layer 14. A direction of the voltage applied to the first piezoelectric layer 12 may be opposite to a direction of the voltage applied to the second piezoelectric layer 14. For example, the voltages applied to the first and second piezoelectric layers 12 and 14 may have opposite phases. Accordingly, a stretching direction of the first piezoelectric layer 12 may be opposite or inverted (or reversed) to a stretching direction of the second piezoelectric layer 14.

As illustrated in FIG. 5, the second piezoelectric layer 14 may be deformed in a direction expanding in a horizontal direction at a timing at which the first piezoelectric layer 12 is deformed to contract in the horizontal direction. Therefore, an end portion of the piezoelectric device 10 may be bent in a direction closer to the display panel 20. For example, the display panel 20 may be deformed based on a stress applied thereto toward the piezoelectric device 10.

As illustrated in FIG. 6, the second piezoelectric layer 14 may be deformed in a direction contracting in a horizontal direction at a timing at which the first piezoelectric layer 12 is deformed to expand in the horizontal direction. Therefore, the end portion of the piezoelectric device 10 may be bent in a direction distancing from the display panel 20. For example, the display panel 20 may be deformed based on a stress applied thereto in a direction distancing from the piezoelectric device 10.

When an AC voltage based on a sound signal is applied to the piezoelectric device 10, a shape (or a form) illustrated in FIG. 5 and a shape (or a form) illustrated in FIG. 6 may be alternately repeated in a frequency of a sound. Thus, a vibration of the piezoelectric device 10 may be transferred to the display panel 20 to vibrate the display panel 20. Accordingly, the display panel 20 may act as a speaker so that the display panel 20 generates a sound based on a sound signal.

Figure 7:
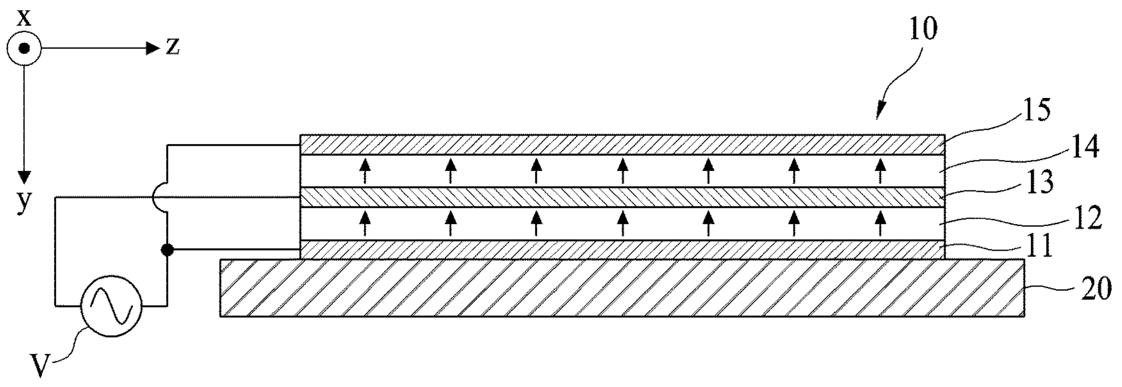
FIG. 7 is a cross-sectional view illustrating a configuration of a piezoelectric device according to a comparative example.
Figure 8:
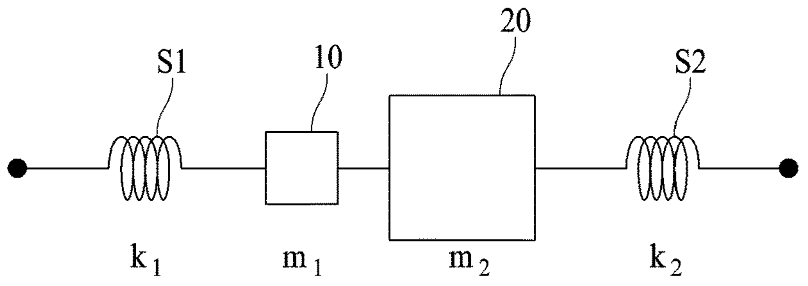
FIG. 8 is a schematic diagram illustrating a vibration model according to the comparative example.

In the related art, an effect obtained when a portion of a piezoelectric device 10 is connected to a display panel 20 by an elastic member 30 will be described. FIG. 7 is a cross-sectional view illustrating a configuration of a piezoelectric device 10 according to a comparative example. FIG. 8 is a schematic diagram illustrating a vibration model according to the comparative example.

In the comparative example illustrated in FIG. 7, a whole surface of the piezoelectric device 10 may be directly connected to the display panel 20. Based on such a configuration, a displacement of the piezoelectric device 10 may be transferred to the display panel 20, and thus, the display panel 20 may act as a speaker. The vibration model according to the comparative example illustrated in FIG. 8, a plurality of springs S1 and S2 may be connected to both ends of a mass point representing the piezoelectric device 10 and the display panel 20. The piezoelectric device 10 having a mass $m_1$ may be directly connected to the display panel 20 having a mass mz.

The spring S1 having a spring constant $k_1$ may be connected to the piezoelectric device 10, and the spring S2 having a spring constant $k_2$ may be connected to the display panel 20. The spring S1 may be implemented by modeling the elasticity of the piezoelectric device 10. The spring S2 may be implemented by modeling the elasticity of the display panel 20 or the elasticity of a member, which binds the display panel 20 such as a case or the like. Also, in the vibration model, both ends thereof may be a fixed end or a fixed member.

In the vibration model of the comparative example, the piezoelectric device 10 and the display panel 20 may be replaced with one mass point having a mass $m_1+m_2$. When a voltage is applied to the piezoelectric device 10, a force generated by the piezoelectric device 10 may vibrate all of the display panel 20 and the piezoelectric device 10 having the mass $m_1+m_2$. For example, the mass $m_1+m_2$ may be far greater than a mass $m_1$. The force generated by the piezoelectric device 10 may affect an object having a very large mass, and thus, an acceleration applied to the piezoelectric device 10 and the first vibration member 20 by the force may be small. Accordingly, a displacement amount of the piezoelectric device 10 and the display panel 20 may be smaller, and in a configuration of the comparative example, the sound pressure of sound generated from the display panel 20 may be difficult to increase.

Figure 9:
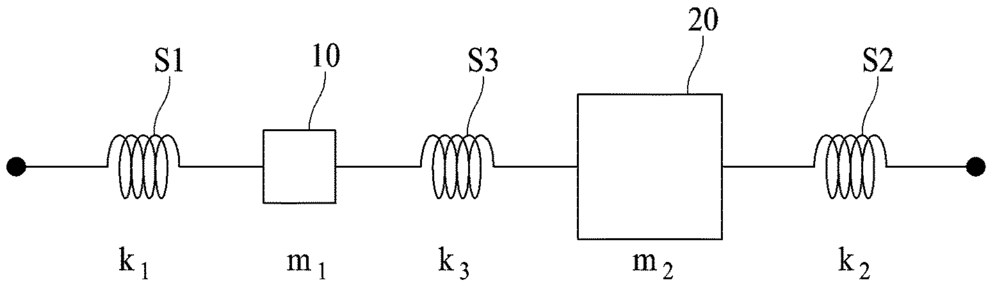
FIG. 9 is a schematic diagram illustrating a vibration model according to the related art.

FIG. 9 is a schematic diagram illustrating a vibration model according to the related art. In the vibration model according to the related art illustrated in FIG. 9, a spring S3 having a spring constant $k_3$ is connected between a mass point representing a display panel 20 and a piezoelectric device 10. The spring S3 may be implemented by modeling the elasticity of an elastic member 30. The piezoelectric device 10 having a mass $m_1$ and the display panel 20 having a mass $m_2$ is connected to through the spring S3.

In the vibration model according to the related art, the piezoelectric device 10 and the display panel 20 are independently displaced from each other. A force, generated when a voltage is applied to the piezoelectric device 10, vibrates the piezoelectric device 10 having the mass $m_1$. For example, a mass of an object to which the force is applied may be less than the comparative example, and thus, an acceleration applied to the piezoelectric device 10 by the force may be greater than the comparative example. Therefore, the piezoelectric device 10 may be a resonance state with large displacement. Also, a displacement of the piezoelectric device 10 may be gradually transferred to the display panel 20 through the spring S3, and thus, like the comparative example, suppression of displacement by a mass of the display panel 20 may be difficult to occur. Accordingly, in an aspect of the related art, displacement may increase compared to the comparative example, and thus, a sound pressure level may be enhanced.

Figure 10:
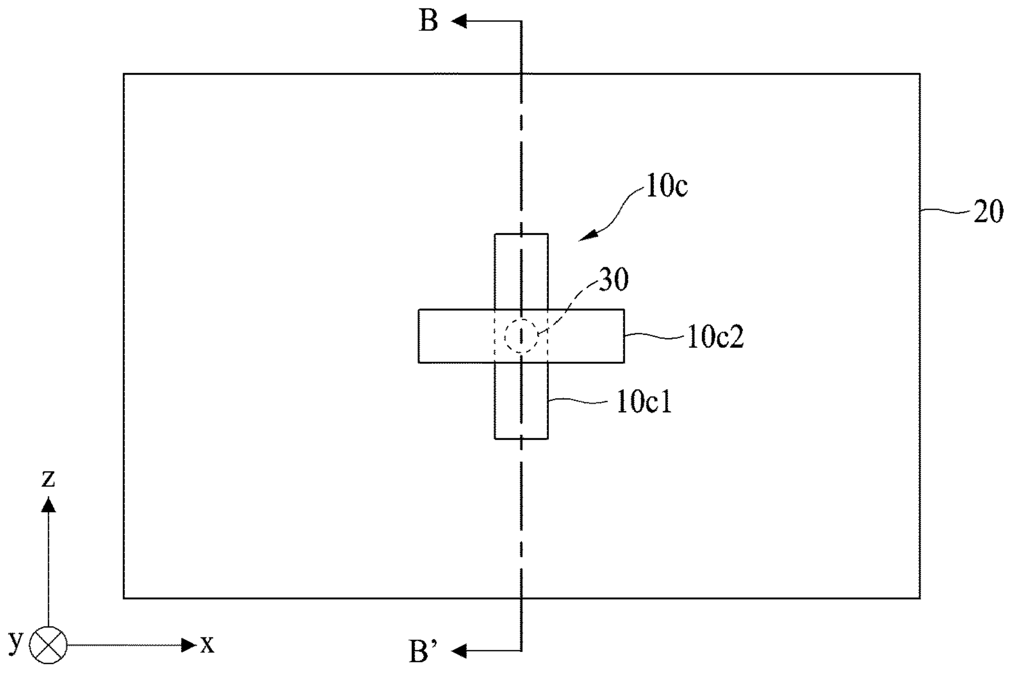
FIG. 10 is a plan view illustrating a schematic configuration of piezoelectric device according to a modification aspect of the related art.
Figure 11:
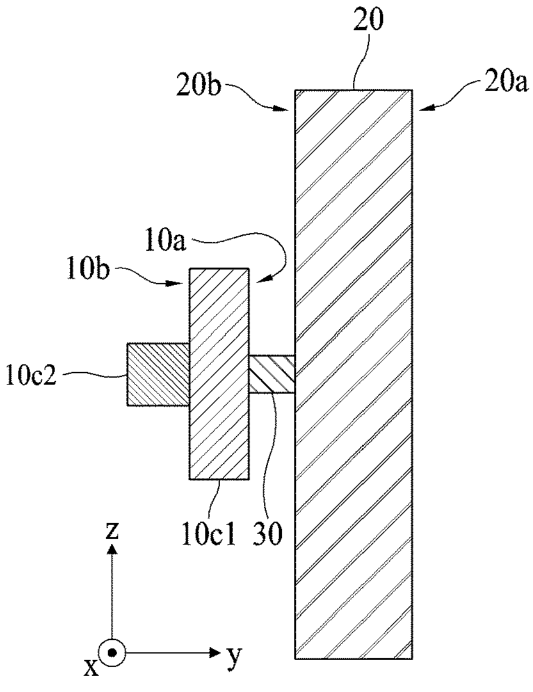
FIG. 11 is a cross-sectional view illustrating a schematic configuration of piezoelectric device according to a modification aspect of the related art.

FIG. 10 is a plan view illustrating a schematic configuration of piezoelectric device according to a modification aspect of the related art. FIG. 11 is a cross-sectional view illustrating a schematic configuration of piezoelectric device according to a modification aspect of the related art. FIG. 11 is a cross-sectional view illustrating a cross-sectional surface taken along line B-B' of FIG. 10.

As illustrated in FIG. 10, the piezoelectric device **10*c* according to a modification example of the related art may include a first vibration portion 10*c*1 and a second vibration portion 10*c*2, which extend in different directions in a plan view. A configuration of the first vibration portion 10*c*1 may be the same as the piezoelectric device 10. For example, the first vibration portion 10*c*1 may be a rectangular shape having a long-side direction (a z direction in FIGS. 10 and 11) and a short-side direction (an x direction in FIGS. 10 and 11) with respect to a plan view, and may be a flat plate shape. The second vibration portion 10*c*2 may extend in a direction which differs from the first vibration portion 10*c*1. For example, the second vibration portion 10*c*2 may be a rectangular shape having a long-side direction (an x direction in FIGS. 10 and 11) and a short-side direction (a z direction in FIGS. 10 and 11) with respect to a plan view, and may be a flat plate shape. The long-side direction of the first vibration portion 10*c*1 may be perpendicular to the long-side direction of the second vibration portion 10*c*2. For example, the first vibration portion 10*c*1 and the second vibration portion 10*c*2** may be disposed in a '+'-shape in a plan view, but aspects of the present disclosure are not limited thereto.

As illustrated in FIG. 11, the first vibration portion 10*c*1 may include a first main surface and a second main surface. An elastic member 30 may connect the first main surface of the first vibration portion 10*c*1 to a rear surface (or a backside surface) 20*b* of a display panel 20. The elastic member 30 may be connected to only a portion of the first front surface of the first vibration portion 10*c*1. As described above, the piezoelectric device 10 and the elastic member 30 may be disposed at the rear surface 20*b* of the display panel 20 so that obstruction does not occur while a user is watching an image display surface 20*a*.

The second vibration portion 10*c*2 may be connected to only a portion of a rear surface (or a backside surface) of the first vibration portion 10*c*1. Both end portions of the first vibration portion 10*c*1 in a long-side direction thereof may be in a lifted state, and both end portions of the second vibration portion 10*c*2 in a long-side direction thereof may be in a lifted state. When both end portions of each of the first vibration portion 10*c*1 and the second vibration portion 10*c*2 in a long-side direction thereof are in a lifted state, it may be difficult to suppress the vibration of the piezoelectric device 10 at the both end portions, where a displacement of a bending vibration is large, of the piezoelectric device 10 in the long-side direction thereof.

Figure 12:
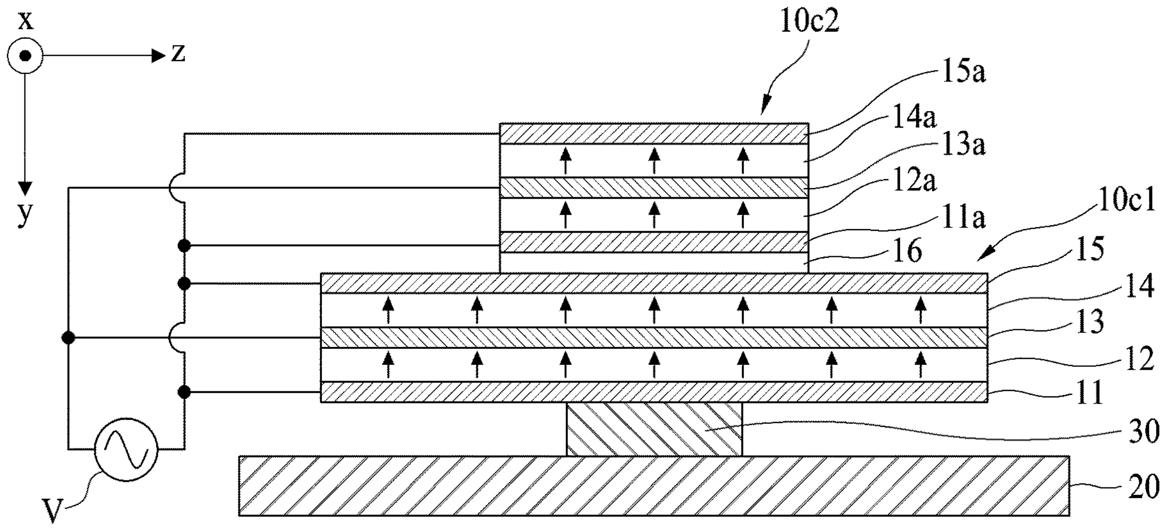
FIG. 12 is a cross-sectional view illustrating in more detail a structure of a piezoelectric device according to a modification aspect of the related art.

FIG. 12 is a cross-sectional view illustrating in more detail a structure of a piezoelectric device 10*c* according to a modification example of the related art. FIG. 12 is a cross-sectional view taken along line B-B' illustrated in FIG. 10 like FIG. 11 although a direction in which FIG. 11 is rotated 90 degrees to the right. Also, FIG. 12 schematically illustrates, by a circuit diagram, a connection relationship between electrodes included at the piezoelectric device 10*c*, for describing a method of inputting a sound signal to the piezoelectric device 10*c*.

The piezoelectric device 10*c* illustrated in FIG. 12 may include a structure where two bimorphs are stacked. The piezoelectric device 10*c* illustrated in FIG. 12 may include the first vibration portion 10*c*1 and the second vibration portion 10*c*2. A structure of the first vibration portion 10*c*1 may be the same as the piezoelectric device 10. Also, in FIG. 12, an insulation layer 16 may be disposed between the first vibration portion 10*c*1 and the second vibration portion 10*c*2, but this may not be essential.

The piezoelectric device 10*c* illustrated in FIG. 12 may include a first electrode 11*a*, a first piezoelectric layer 12*a*, a second electrode (or common electrode) 13*a*, a second piezoelectric layer 14*a*, and a third electrode 15*a*. The first electrode 11*a* may be disposed closest to the display panel 20 and may be connected to the insulation layer 16. The third electrode 15*a* may be disposed farthest from the display panel 20. The second electrode 13*a* may be disposed between the first electrode 11*a* and the third electrode 15*a*. The first piezoelectric layer 12*a* may be supported between the first electrode 11*a* and the second electrode 13*a*. The second piezoelectric layer 14*a* may be supported between the second electrode 13*a* and the third electrode 15*a*. Arrows represented inside the first piezoelectric layer 12*a* and the second piezoelectric layer 14*a* represent polarization directions, and the polarization direction of the first piezoelectric layer 12*a* may be the same as the polarization direction of the second piezoelectric layer 14*a*. Also, a line (or wiring line) to apply a voltage to each electrode may be connected to the first electrode 11*a*, the second electrode 13*a*, and the third electrode 15*a*, but in FIG. 12, the illustration of the line is omitted. Also, a connection of the line may be performed by soldering or the like, but aspects of present disclosure are not limited to a specific method.

A voltage applied to the piezoelectric device 10*c* may be based on a sound signal, and thus, may be an AC voltage corresponding to a frequency of a sound which is to be generated. In FIG. 12, the AC voltage is represented by a circuit sign for an AC power. In the AC power V, one terminal (or a first terminal) may be connected to the first and third electrodes 11*a* and 15*a*, and the other terminal (or a second terminal) may be connected to the second electrode 13*a*. For example, the voltage applied to the first electrode 11*a* and the voltage applied to the third electrode 15*a* may be the same phase (or in-phase), the voltage applied to the first electrode 11*a* and the voltage applied to the second electrode 13*a* may be opposite phases (or anti-phases), and the voltage applied to the second electrode 13*a* and the voltage applied to the third electrode 15*a* may be the opposite phase (or anti-phase). Accordingly, the voltage applied to the first piezoelectric layer 12*a* and the voltage applied to the second piezoelectric layer 14*a* may be in opposite phases (or anti-phases).

In each of the first vibration portion 10*c*1 and the second vibration portion 10*c*2, when one of the two piezoelectric layers contracts in a horizontal direction, the other one of two piezoelectric layers may expand in the horizontal direction. Therefore, each of the first vibration portion 10*c*1 and the second vibration portion 10*c*2 may vibrate to be bent (or windingly) like the piezoelectric element 10. Also, a polarization direction and a direction of a voltage may be as described above, and thus, the first vibration portion 10*c*1 and the second vibration portion 10*c*2 may vibrate in the same phase (or same direction) in response to a sound signal. Accordingly, a vibration generated by the first vibration portion 10*c*1 and a vibration generated by the second vibration portion 10*c*2 may be reinforced, and thus, vibration efficiency may be enhanced.

According to the modification example of the related art, like the related art, a sound pressure level of a sound generated by the display panel 20 may be enhanced, and thus, sound quality may be enhanced. Also, the piezoelectric device 10*c* of the modification example of the related art may have two vibration portions, and thus, a sound pressure level may be more enhanced than the piezoelectric device 10 of the related art having only one vibration portion.

Moreover, in the related art, the vibration portion has one piezoelectric device 10, and thus, a distribution of vibrations may concentrate in a long-side direction of the piezoelectric device 10, for example, one-dimensionally. Therefore, a resonance of the display panel 20 may be easy to occur, and due to this, noise caused by the resonance may increase. On the other hand, in an aspect of the present disclosure, in the modification example of the related art, the piezoelectric device 10*c* has the first vibration portion 10*c*1 and the second vibration portion 10*c*2 extending in different directions, and thus, a distribution of vibrations may be two-dimensionally and may be difficult to concentrate on a specific portion. Therefore, a resonance of the display panel 20 may be difficult to occur. Accordingly, in an aspect of the present disclosure, noise caused by the resonance of the display panel 20 may be reduced, and thus, the sound quality may be more enhanced.

As described above, according to the related art and the modification example of the related art, when the display panel 20 acts as a speaker, a sound pressure level of a sound generated by the display panel 20 may be enhanced.

Moreover, in the related art and the modification example of the related art, a vibration source is the piezoelectric device 10 or the piezoelectric device 10*c*, but a sound generating source is the display panel 20 which is large in mass and is low in natural frequency. Therefore, in the related art, a sound pressure level of a low-pitched sound band may be more enhanced than that from a configuration, where the piezoelectric device 10 directly generates a sound, or a configuration where a sound is generated by a member which connects the piezoelectric device 10 to a separate small vibration plate differing from the display panel 20 and has a high natural frequency.

<First Aspect>

As described above, according to related art described above, a sound pressure level of a low pitched sound band may be enhanced, but it is required to improve sound quality and a sound pressure level. An aspect of the present disclosure, as described below, may more enhance sound quality and a sound pressure level.

Figure 13:
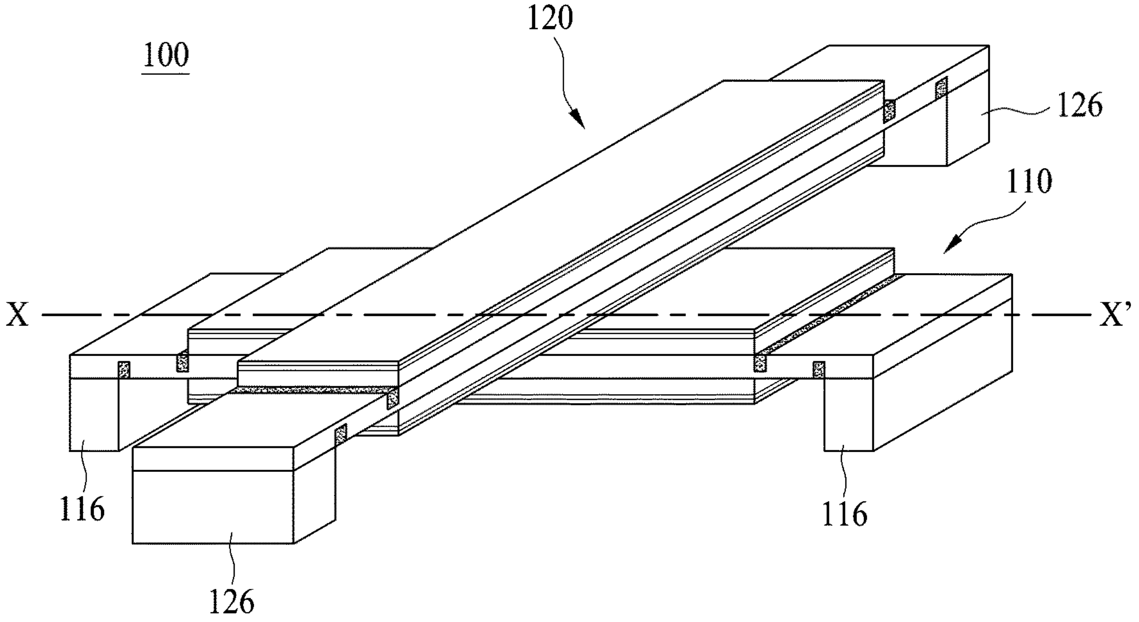
FIG. 13 is a perspective view illustrating a structure of a sound generator according to a first aspect of the present disclosure.

FIG. 13 is a perspective view illustrating a structure of a sound generator 100 according to a first aspect of the present disclosure. The sound generator 100 illustrated in FIG. 13 may include a first vibration device (or a first piezoelectric device) 110 and a second vibration device (or a second piezoelectric device) 120, which extend along different directions in a plan view, and may be disposed on a vibration plate. An extension direction of the first vibration device 110 may intersect with an extension direction of the second vibration device 120. The extension direction of the first vibration device 110 may be almost perpendicular to the extension direction of the second vibration device 120. Each of the first vibration device 110 and the second vibration device 120 may be attached at a vibration plate through at least one elastic supporting portions 116 and 126. For example, the first vibration device 110 may be attached at a vibration plate through the elastic supporting portion 116, and the second vibration device 120 may be attached at a vibration plate through the elastic supporting portion 126.

Figure 14:
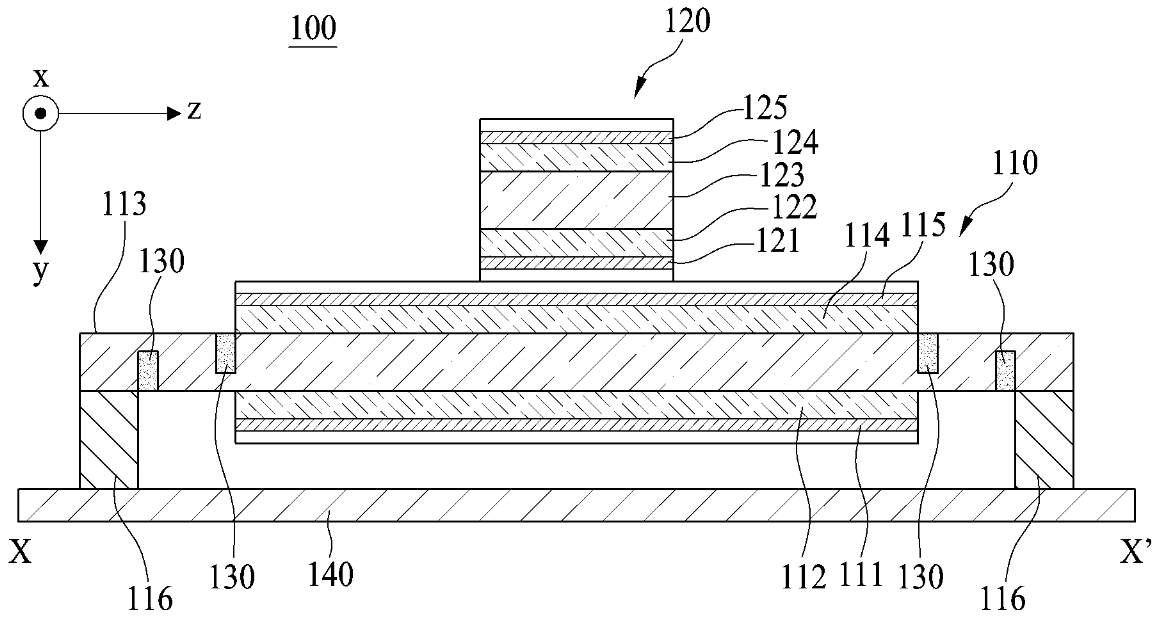
FIG. 14 is a cross-sectional view taken along line X-X' illustrated in FIG. 13.

FIG. 14 is a cross-sectional view illustrating the sound generator 100 according to the first aspect of the present disclosure and is a cross-sectional view taken along line X-X' illustrated in FIG. 13.

With reference to FIGS. 13 and 14, the sound generator 100 according to the first aspect of the present disclosure may include a vibration plate 140, a vibration portion disposed at a rear surface of the vibration plate 140, and a plurality of connection portions 116 and 126 connected between the vibration plate 140 and the vibration portion. The vibration portion may include a first vibration device 110 and a second vibration device 120, which intersect with each other. The first vibration device 110 and the second vibration device 120 may respectively include a plurality of piezoelectric layers 112 and 114 and piezoelectric layers 122 and 124 and common electrodes 113 and 123 which are disposed between the plurality of piezoelectric layers 112 and 114 and piezoelectric layers 122 and 124 and include at least one weight member 130. For example, the connection portions 116 and 126 may each be a supporting portion or an elastic supporting portion, and in the following description, the connection portions 116 and 126 may each be referred to as an elastic supporting portion. For example, the weight member 130 may be an elastic member or a weight, and in the following description, the weight member 130 may be referred to as an elastic member.

A shape of the first vibration device 110 may be a rectangular shape having a long-side direction (a z-axis direction) and a short-side direction (an x-axis direction) in a plan view, and for example, may be a plate shape. A shape of the second vibration device 120 may be a rectangular shape having a long-side direction (a z-axis direction) and a short-side direction (an x-axis direction) in a plan view, and for example, may be a plate shape. Accordingly, as seen in a cross-sectional surface in a long-side direction, deformation may occur like being bent (or flexural). The long-side direction of the first vibration device 110 and the long-side direction of the second vibration device 120 may differ, and for example, may be almost perpendicular to each other.

The elastic supporting portion 116 may be connected between both end portions (or periphery portions of the first vibration device 110 in the long-side direction thereof and the vibration plate 140. Also, in the first vibration device 110, an insulation layer (or a protection member) (white configuration in the drawing) may be disposed at an outer portion (a lower portion in the drawing) of the first electrode 111 and an outer portion (an upper portion in the drawing) of the third electrode 115, but the insulation layer may not be provided. Also, in the second vibration device 120, an insulation layer (or a protection member) (white configuration in the drawing) may be disposed at an outer portion (a lower portion in the drawing) of the first electrode 121 and an outer portion (an upper portion in the drawing) of the third electrode 125, and in the following description, the insulation layer may not be provided in the other drawing.

The first vibration device 110 illustrated in FIGS. 13 and 14 may include a first electrode 111, a first piezoelectric layer 112, a second electrode 113, a second piezoelectric layer 114, and a third electrode 115. The first electrode 111 may be disposed closest to the vibration plate 140. The third electrode 115 may be disposed farthest away from the vibration plate 140. The second electrode 113 may be disposed between the first electrode 111 and the third electrode 115 and may be connected to the elastic supporting portion (or a first supporting portion) 116. The first piezoelectric layer 112 may be supported between the first electrode 111 and the second electrode 113. The second piezoelectric layer 114 may be supported between the second electrode 113 and the third electrode 115. Furthermore, although not shown, each of the first electrode 111, the second electrode 113, and the third electrode 115 may be connected to a line for applying a voltage thereto, but in FIG. 14, the illustration of the line is omitted. Also, a connection of the line may be performed by soldering or the like, but aspects of present disclosure are not limited to a specific method.

In the first vibration device 110, the second electrode 113 may be a common electrode including the elastic member 130. The second electrode 113 may include an extension portion, extending up to a region which does not overlap the first electrode 111, the first piezoelectric layer 112, the second piezoelectric layer 114, and the third electrode 115, at both ends of the second electrode 113 in the long-side direction thereof, and a center thereof in the long-side direction may be in a lifted state. As described above, because the center in the long-side direction where a displacement of a flexural vibration is large is in a lifted state, a reduction in vibration of the first vibration device 110 may be prevented. The second electrode 113 may include an elastic member 130.

The elastic member 130 may extend in a short-side direction in a region, which does not overlap the first electrode 111, the first piezoelectric layer 112, the second piezoelectric layer 114, and the third electrode 115 and does not overlap the elastic supporting portion 116, of a region of the second electrode 113. The elastic member 130 may be disposed at an upper concave portion (or a first concave portion) close to a center of the second electrode 113 and a lower concave portion (or a second concave portion) close to both end portions of the second electrode 113. For example, the elastic member 130 and the concave portion included in the second electrode 113 may cause a position-based mass (or weight) difference of the second electrode 113, and thus, may function as a weight member (or a weight). Therefore, a mass of both ends of the first vibration device 110 may increase based on the elastic member 130, the degree of elasticity may increase based on a composite effect of an elastic modulus (or Young's modulus) of two elastic supporting portions 116, and a displacement width of the first vibration device 110 may increase based on the increased mass. For example, the elastic member 130 may include an elastic material, but aspects of the present disclosure are not limited thereto. For example, the elastic member 130 may be formed by an elastomer, but aspects of the present disclosure are not limited thereto.

Also, the second vibration device 120 illustrated in FIGS. 13 and 14 may include a first electrode 121, a first piezoelectric layer 122, a second electrode 123, a second piezoelectric layer 124, and a third electrode 125. The first electrode 121 may be disposed closest to the vibration plate 140. The third electrode 125 may be disposed farthest away from the vibration plate 140. The second electrode 123 may be disposed between the first electrode 121 and the third electrode 125 and may be connected to the elastic supporting portion (or a second supporting portion) 126. The first piezoelectric layer 122 may be supported between the first electrode 121 and the second electrode 123. The second piezoelectric layer 124 may be supported between the second electrode 123 and the third electrode 125. Furthermore, although not shown, each of the first electrode 121, the second electrode 123, and the third electrode 125 may be connected to a line for applying a voltage thereto, but in FIG. 14, the illustration of the line is omitted. Also, a connection of the line may be performed by soldering or the like, but aspects of present disclosure are not limited to a specific method.

In the second vibration device 120, the second electrode 123 may be a common electrode including the elastic member 130. The second electrode 123 may be configured identically to the second electrode 113 of the first vibration device 110. Therefore, like the second electrode 113 of the first vibration device 110, a mass of both ends of the second vibration device 120 may increase, the degree of elasticity may increase based on a composite effect of an elastic modulus (or Young's modulus) of two elastic supporting portions 126, and a displacement width of the second vibration device 120 may increase based on the increased mass.

According to an aspect of the present disclosure, the elastic member 130 illustrated in FIGS. 13 and 14 may be disposed at an upper concave portion close to a center of the second electrode 113 and a lower concave portion close to both end portions of the second electrode 113.

Figure 15:
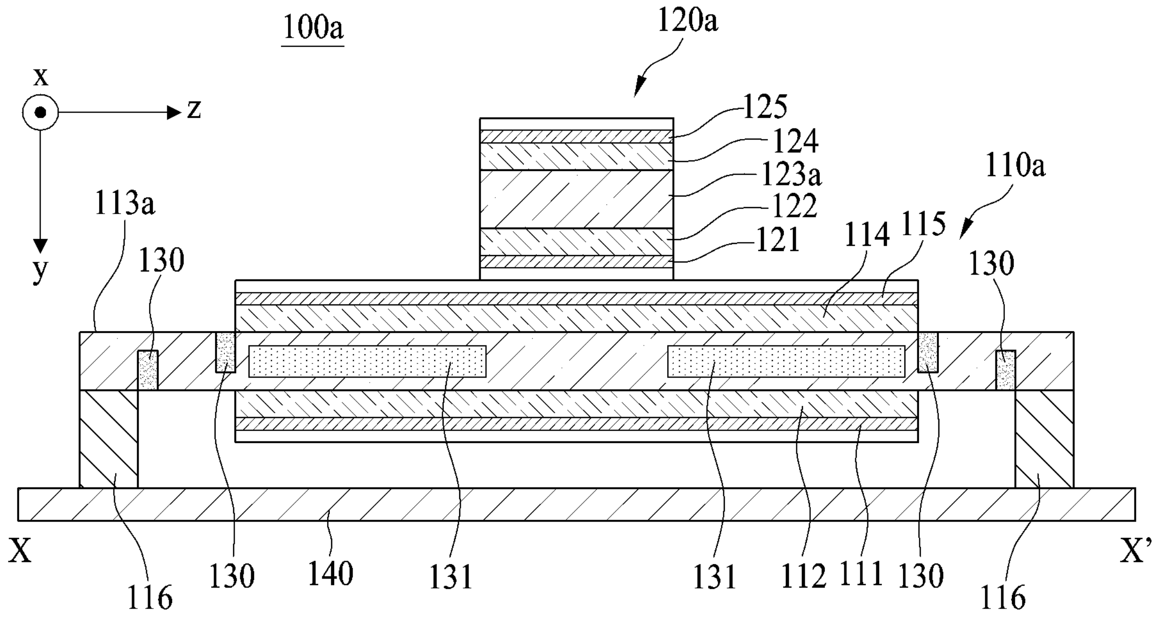
FIG. 15 is a cross-sectional view illustrating a structure of a sound generator according to a first modification aspect of the first aspect of the present disclosure.

FIG. 15 is a cross-sectional view illustrating a structure of a sound generator 100*a* according to a first modification aspect of the first aspect of the present disclosure. The sound generator 100*a* illustrated in FIG. 15 may include a first vibration device 110*a* and a second vibration device 120*a*. In that the first vibration device 110*a* includes a second electrode 113*a*, the first vibration device 110*a* may differ from the first vibration device 110, and the other elements may be the same as that of the first vibration device 110.

The second electrode 113*a* may include an elastic member 130. The elastic member 130 may be disposed at a lower concave portion (or a first concave portion) close to a center of the second electrode 113*a* and an upper concave portion (or a second concave portion) close to both end portions of the second electrode 113*a*. Also, at least one elastic member (or a second weight member) 131 may be further disposed at a center in a thickness direction of the second electrode 113*a* in a region other than a center of the second electrode 113*a* in a long-side direction thereof. For example, in the second electrode 113*a*, a region other than a center in the long-side direction may be a region which does not overlap the second vibration device 120*a* and overlaps the first electrode 111, the first piezoelectric layer 112, the second piezoelectric layer 114, and the third electrode 115. For example, at least one elastic member 131 may be disposed between the elastic member 130 and the center of the second electrode 113*a* in the long-side direction not to overlap the second vibration device 120*b* and may be disposed at a center in a thickness direction of an extension portion of the second electrode 113*a*, and thus, may overlap the first electrode 111, the first piezoelectric layer 112, the second piezoelectric layer 114, and the third electrode 115.

In that the second vibration device 120*a* includes the second electrode 123*a*, the second vibration device 120*a* may differ from the second vibration device 120 illustrated in FIGS. 13 and 14, and the other elements may be the same as that of the second vibration device 120. Although not shown, the elastic members 130 and 131 may be in the second electrode 123*a* like the second electrode 113*a*. A structure illustrated in FIG. 15 may obtain the same effect as a structure illustrated in FIGS. 13 and 14. Furthermore, in the structure illustrated in FIG. 15, the elastic member 131 may be further disposed at a center in a thickness direction of the second electrode 113*a*, and thus, the second electrode 113*a* and the second electrode 123*a* may have elasticity which is more enhanced than that of the second electrode 113 and the second electrode 123, and thus, may have a large displacement in vibrating. When a displacement increases in vibrating, a total amplitude of a vibration device may increase, and thus, a sound pressure level may be more enhanced. Also, a perspective view of the structure illustrated in FIG. 15 may refer to FIG. 13 and is omitted.

Figure 16:
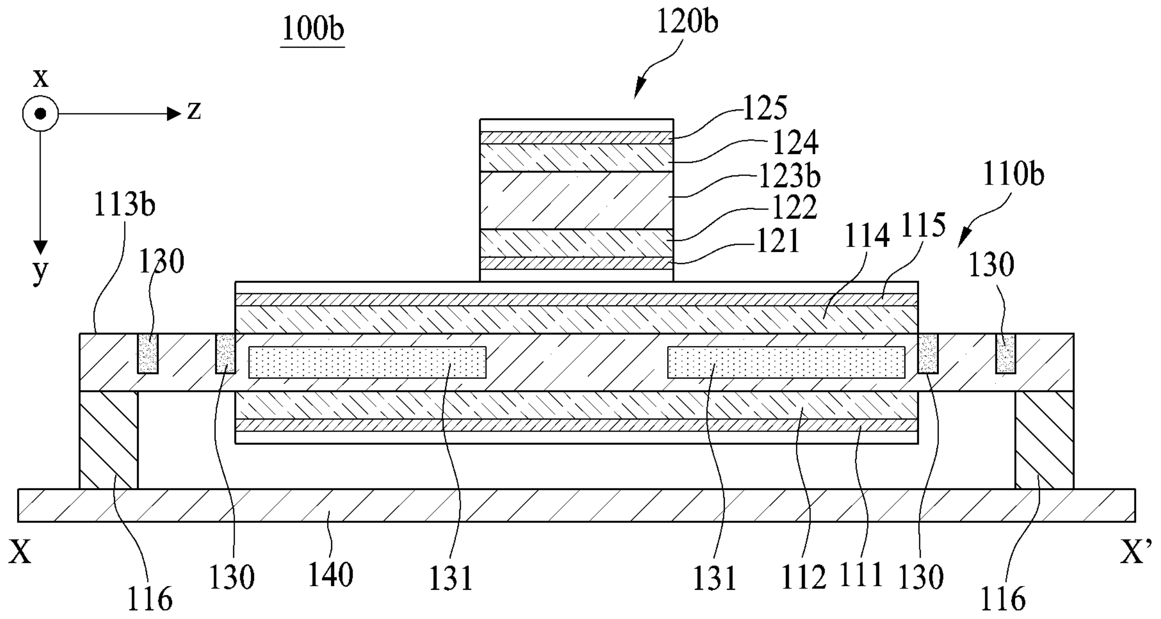
FIG. 16 is a cross-sectional view illustrating a structure of a sound generator according to a second modification aspect of the first aspect of the present disclosure.

FIG. 16 is a cross-sectional view illustrating a structure of a sound generator 100*b* according to a second modification aspect of the first aspect of the present disclosure. The sound generator 100*b* illustrated in FIG. 16 may include a first vibration device 110*b* and a second vibration device 120*b*. In that the first vibration device 110*b* includes a second electrode 113*b*, the first vibration device 110*b* may differ from the first vibration device 110 illustrated in FIGS. 13 and 14, and the other elements may be the same as that of the first vibration device 110.

The second electrode 113*b* may include an elastic member 130. The elastic member 130 may be disposed at an upper concave portion (or a first concave portion) close to a center of the second electrode 113*b* and an upper concave portion (or a second concave portion) close to both end portions of the second electrode 113*b*. Also, at least one elastic member (or a second weight member) 131 may be disposed at a center in a thickness direction of the second electrode 113*b* in a region other than a center of the second electrode 113*b* in a long-side direction thereof. For example, in the second electrode 113*b*, a region other than a center in the long-side direction may be a region which does not overlap the second vibration device 120*b* and overlaps the first electrode 111, the first piezoelectric layer 112, the second piezoelectric layer 114, and the third electrode 115. For example, at least one elastic member 131 may be disposed between the elastic member 130 and the center of the second electrode 113*b* in the long-side direction not to overlap the second vibration device 120*b* and may be disposed at a center in a thickness direction of an extension portion of the second electrode 113*b* in a thickness direction, and thus, may overlap the first electrode 111, the first piezoelectric layer 112, the second piezoelectric layer 114, and the third electrode 115.

In that the second vibration device 120*b* includes the second electrode 123*b*, the second vibration device 120*b* may differ from the second vibration device 120 illustrated in FIGS. 13 and 14, and the other elements may be the same as that of the second vibration device 120. Although not shown, the elastic member 130 may be in the second electrode 123*b* like the second electrode 113*b*. A structure illustrated in FIG. 16 may obtain the same effect as a structure illustrated in FIGS. 13 and 14. Furthermore, in the structure illustrated in FIG. 16, the second electrode 123*b* may have elasticity which is more enhanced than that of the second electrode 113 and the second electrode 123, and thus, may have a large displacement in vibrating. When a displacement increases in vibrating, a total amplitude of a vibration device may increase, and thus, a sound pressure level may be more enhanced. Also, a perspective view of the structure illustrated in FIG. 16 may refer to FIG. 13 and is omitted.

According to an aspect of the present disclosure, the elastic member 130 illustrated in FIG. 16 may be disposed at a lower concave portion close to a center of the second electrode 113B and a lower concave portion close to both end portions of the second electrode 113*b*, but aspects of the present disclosure are not limited thereto.

Figure 17:
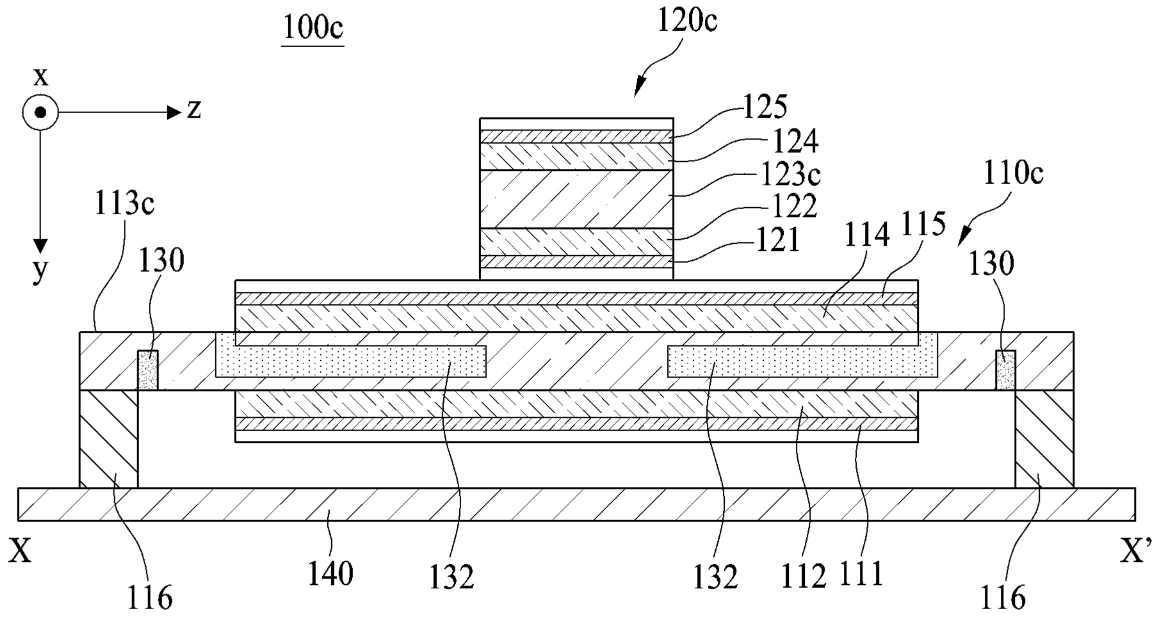
FIG. 17 is a cross-sectional view illustrating a structure of a sound generator according to a third modification aspect of the first aspect of the present disclosure.

FIG. 17 is a cross-sectional view illustrating a structure of a sound generator 100*c* according to a third modification aspect of the first aspect of the present disclosure. The sound generator 100*c* illustrated in FIG. 17 may include a first vibration device 110*c* and a second vibration device 120*c*. In that the first vibration device 110*c* includes a second electrode 113*c*, the first vibration device 110*c* may differ from the first vibration device 110 illustrated in FIGS. 13 and 14, and the other elements may be the same as that of the first vibration device 110.

The second electrode 113*c* may include an elastic member 130. The elastic member 130 may be disposed at a lower concave portion (or a groove) close to both ends of the second electrode 113*c*. Also, in the second electrode 113*c*, an elastic member 132 extending up to a position of the elastic member 131 of the second electrode 113*b* from an upper concave portion (or a slit) close to a center may be disposed. For example, the elastic member 132 illustrated in FIG. 17 may have an L-shaped cross-sectional structure where the elastic member 130 disposed at the upper concave portion close to the center of the second electrode 113*b* is coupled to the elastic member 131 disposed at the center of the second electrode 113*b* in the thickness direction in the structure illustrated in FIG. 16. For example, the elastic member (or a second weight member) 132 may be connected to the elastic member (or a weight member) 130.

In that the second vibration device 120*c* includes the second electrode 123*c*, the second vibration device 120*c* may differ from the second vibration device 120 illustrated in FIGS. 13 and 14, and the other elements may be the same. Although not shown, the elastic member 130 and the elastic member 132 may be disposed in the second electrode 123*c* like the first electrode 113*c*. A structure illustrated in FIG. 17 may obtain the same effect as a structure illustrated in FIGS. 13 and 14. Furthermore, in the structure illustrated in FIG. 17, like the structure illustrated in FIG. 15, the second electrode 123*b* may be more enhanced in elasticity, and thus, may have a large displacement in vibrating. When a displacement increases in vibrating, a total amplitude of a vibration device may increase, and thus, a sound pressure level may be more enhanced. Also, a perspective view of the structure illustrated in FIG. 17 may refer to FIG. 13 and is omitted.

Figure 18:
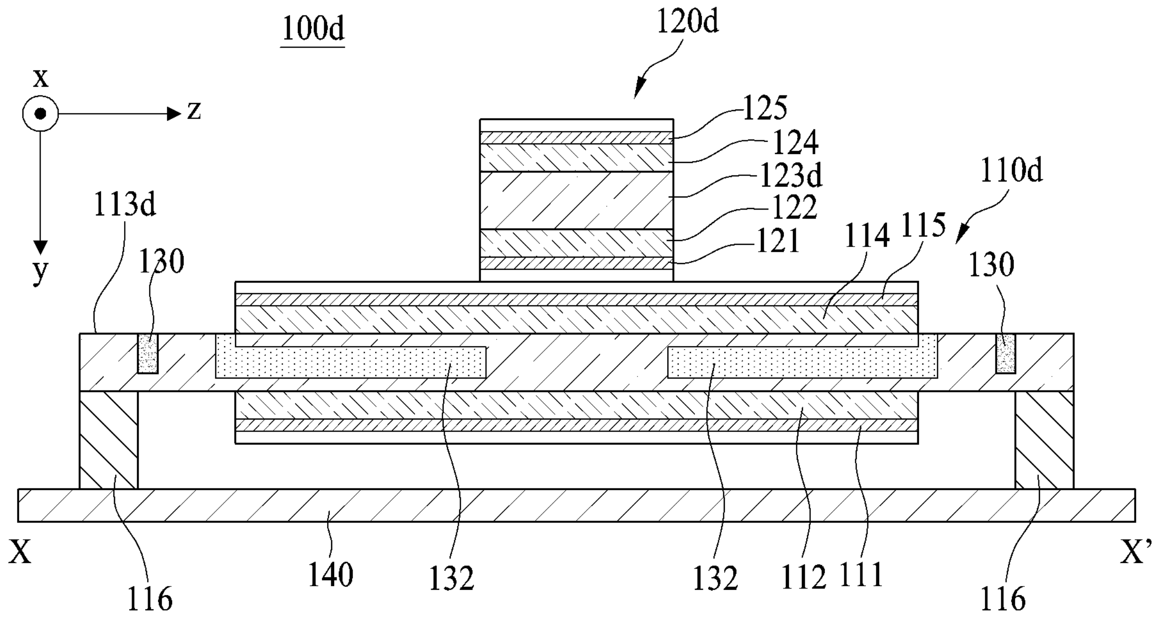
FIG. 18 is a cross-sectional view illustrating a structure of a sound generator according to a fourth modification aspect of the first aspect of the present disclosure.

FIG. 18 is a cross-sectional view illustrating a structure of a sound generator 100*d* according to a fourth modification aspect of the first aspect of the present disclosure. The sound generator 100*d* illustrated in FIG. 18 may include a first vibration device 110*d* and a second vibration device 120*d*. In that the first vibration device 110*d* includes a second electrode 113*d*, the first vibration device 110*d* may differ from the first vibration device 110 illustrated in FIGS. 13 and 14, and the other elements may be the same as that of the first vibration device 110.

The second electrode 113*d* may include an elastic member 130. The elastic member 130 may be disposed at an upper concave portion (or a groove) close to both ends of the second electrode 113*d*. Also, like the second electrode 113*c* illustrated in FIG. 16, an elastic member 132 may be disposed in the second electrode 113*d*.

In that the second vibration device 120*d* includes the second electrode 123*d*, the second vibration device 120*d* may differ from the second vibration device 120 illustrated in FIGS. 13 and 14, and the other elements may be the same as that of the second vibration device 120. Although not shown, the elastic member 130 and the elastic member 132 may be disposed in the second electrode 123*d* like the first electrode 113*d*. A structure illustrated in FIG. 18 may obtain the same effect as the structure illustrated in FIGS. 13 and 14. Furthermore, in the structure illustrated in FIG. 18, like the structure illustrated in FIG. 15, the second electrode 123*d* may be more enhanced in elasticity, and thus, may have a large displacement in vibrating. When a displacement increases in vibrating, a total amplitude of a vibration device may increase, and thus, a sound pressure level may be more enhanced. Also, a perspective view of the structure illustrated in FIG. 18 may refer to FIG. 13 and is omitted.

Figure 19:
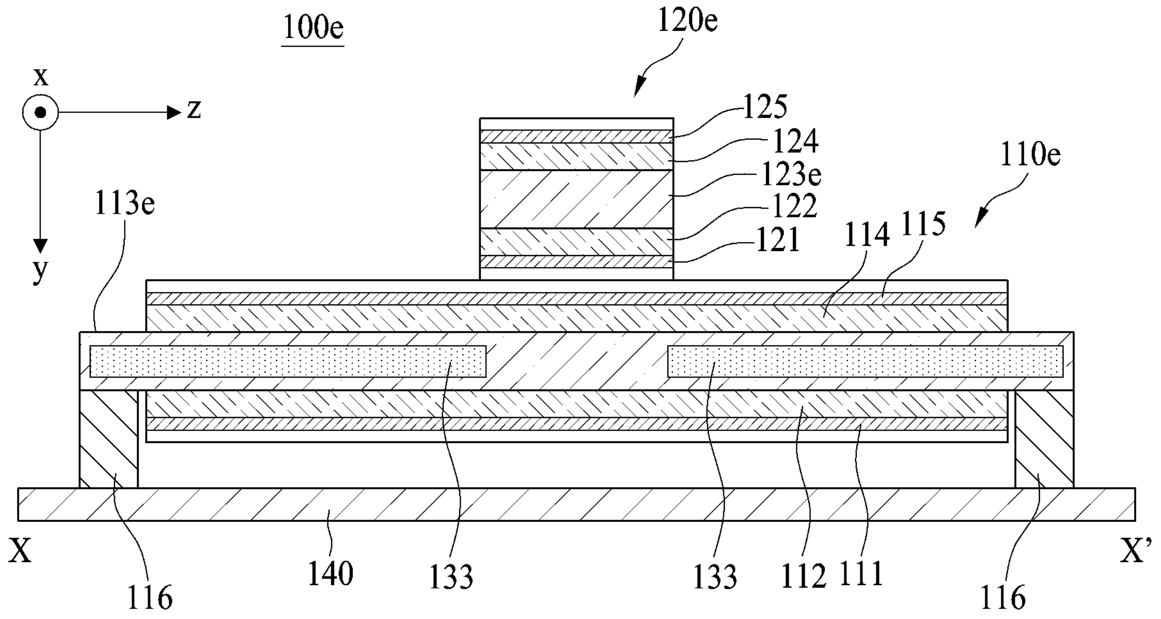
FIG. 19 is a cross-sectional view illustrating a structure of a sound generator according to a fifth modification aspect of the first aspect of the present disclosure.

FIG. 19 is a cross-sectional view illustrating a structure of a sound generator 100*e* according to a fifth modification aspect of the first aspect of the present disclosure. The sound generator 100*e* illustrated in FIG. 19 may include a first vibration device 110*e* and a second vibration device 120*e*. In that the first vibration device 110*e* includes a second electrode 113*e*, the first vibration device 110*e* may differ from the first vibration device 110 illustrated in FIGS. 13 and 14, and the other elements may be the same as that of the first vibration device 110.

The second electrode 113*e* may include an elastic member 133. The elastic member 133 may be disposed at the second electrode 113*e* to overlap at least a portion of an elastic supporting portion 116. For example, in the second electrode 113*e*, the elastic member 133 may have a structure where the elastic member 131 illustrated in FIG. 15 or 16 extends up to at least a portion of a portion overlapping the elastic supporting portion 116.

In that the second vibration device 120*e* includes the second electrode 123*e*, the second vibration device 120*e* may differ from the second vibration device 120 illustrated in FIGS. 13 and 14, and the other elements may be the same as that of the second vibration device 120. Although not shown, the elastic member 133 may be disposed at the second electrode 123*e* like the first electrode 113*e*. A structure illustrated in FIG. 19 may obtain the same effect as the structure illustrated in FIGS. 13 and 14. Also, a perspective view of the structure illustrated in FIG. 19 may refer to FIG. 13 and is omitted.

Figure 20:
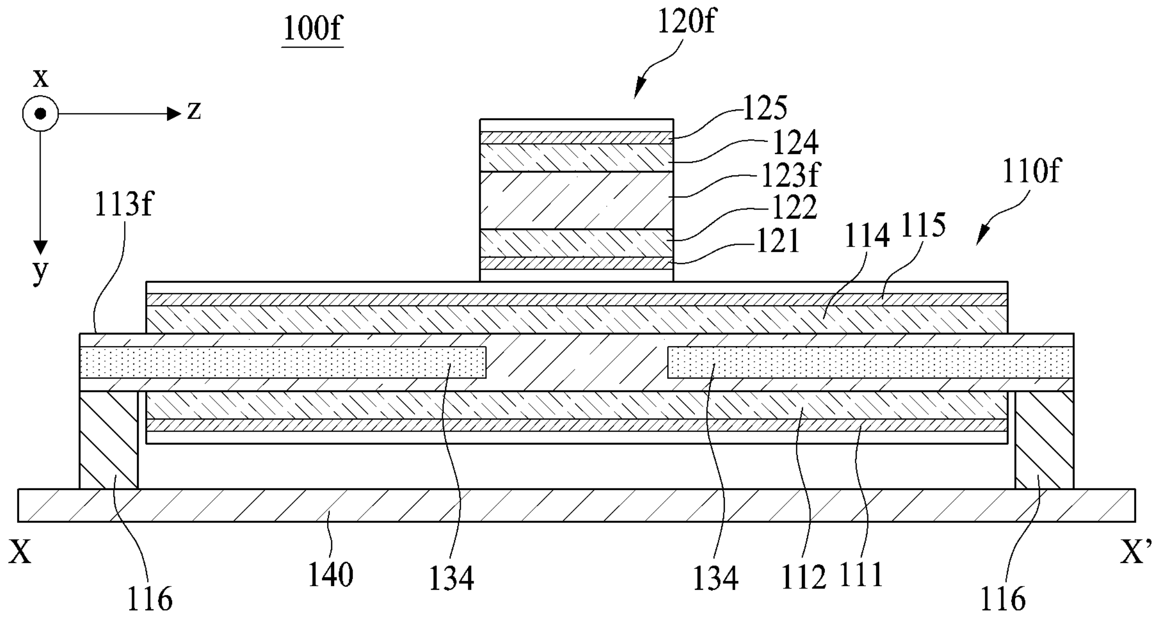
FIG. 20 is a cross-sectional view illustrating a structure of a sound generator according to a sixth modification aspect of the first aspect of the present disclosure.

FIG. 20 is a cross-sectional view illustrating a structure of a sound generator 100*f* according to a sixth modification aspect of the first aspect of the present disclosure. The sound generator 100*f* illustrated in FIG. 20 may include a first vibration device 110*f* and a second vibration device 120*f* In that the first vibration device 110*f* includes a second electrode 113*f*, the first vibration device 110*f* may differ from the first vibration device 110 illustrated in FIGS. 13 and 14, and the other elements may be the same as that of the first vibration device 110.

The second electrode 113*f* may include an elastic member 134. The elastic member 134 may be disposed at the second electrode 113*f* to overlap a whole top surface of an elastic supporting portion 116. For example, in the second electrode 113*f*, the elastic member 134 may have a structure where the elastic member 131 illustrated in FIG. 15 or 16 or the elastic member 133 illustrated in FIG. 19 extends up to both ends of the second electrode 113*f* to overlap the whole top surface of the elastic supporting portion 116. For example, the elastic member 134 may be exposed at an outer surface of the second electrode 113*f*. For example, the elastic supporting portion 116 may be disposed under the elastic member 134.

In that the second vibration device 120*f* includes the second electrode 123*f*, the second vibration device 120*f* may differ from the second vibration device 120 illustrated in FIGS. 13 and 14, and the other elements may be the same as that of the second vibration device 120. Although not shown, the elastic member 134 may be disposed in the second electrode 123*f* like the second electrode 113*f*. A structure illustrated in FIG. 20 may obtain the same effect as the structure illustrated in FIGS. 13 and 14. Also, a perspective view of the structure illustrated in FIG. 20 may refer to FIG. 13 and is omitted.

Figure 21:
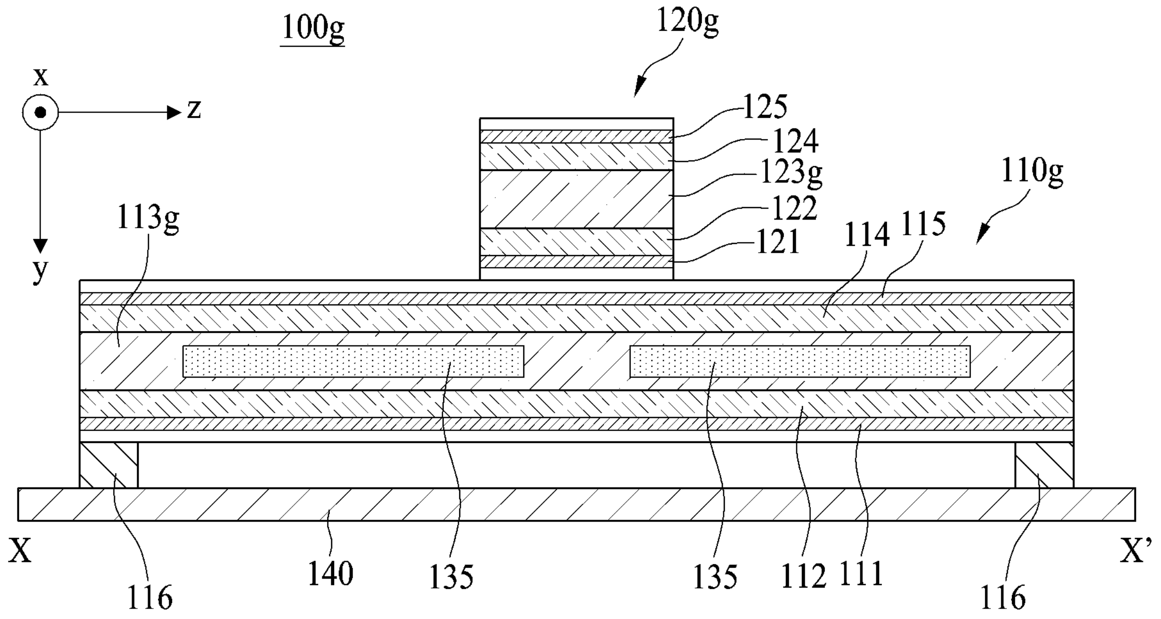
FIG. 21 is a cross-sectional view illustrating a structure of a sound generator according to a seventh modification aspect of the first aspect of the present disclosure.

FIG. 21 is a cross-sectional view illustrating a structure of a sound generator 100*g* according to a seventh modification aspect of the first aspect of the present disclosure. The sound generator 100*g* illustrated in FIG. 21 may include a first vibration device 110*g* and a second vibration device 120*g*. In that the first vibration device 110*g* includes a second electrode 113*g*, the first vibration device 110*g* may differ from the first vibration device 110 illustrated in FIGS. 13 and 14, and the other elements may be the same as that of the first vibration device 110.

An elastic member 135 may be disposed at a center in a thickness direction of the second electrode 113*g*. For example, the elastic member 135 where the elastic member 131 illustrated in FIG. 16 extends to a center axis in a long-side direction may be disposed in the second electrode 113*g*. The elastic member 135 may be disposed outside the center of the second electrode 113*g* so as not to be connected to each other. For example, one side of the elastic member 135 close to the center of the second electrode 113*g* may overlap at least a portion of the second vibration device 120*g*. The other side of the elastic member 135 close to both end portions of the second electrode 113*g* may overlap or not overlap the elastic supporting portion 116.

The elastic supporting portion 116 may be connected to both end portions of each of the first vibration device 110*g* and the second vibration device 120*g* in a long-side direction. For example, the elastic supporting portion 116 may be connected between the vibration plate 140 and first electrodes 111 and 112 of each of the first vibration device 110*g* and the second vibration device 120*g*.

In that the second vibration device 120*g* includes the second electrode 123*g*, the second vibration device 120*g* may differ from the second vibration device 120 illustrated in FIGS. 13 and 14, and the other elements may be the same as that of the second vibration device 120. Although not shown, the elastic member 135 may be disposed at the second electrode 123*g* like the second electrode 113*g*. A structure illustrated in FIG. 21 may obtain the same effect as the structure illustrated in FIGS. 13 and 14. Also, a perspective view of the structure illustrated in FIG. 21 may refer to FIG. 13 and is omitted.

In the first to seventh modification aspects of the present disclosure described above, it has been described that both end portions of each of a first vibration device and a second vibration device in a long-side direction thereof are connected to the vibration plate 140 through the elastic supporting portion 116, but aspects of the present disclosure are not limited thereto.

Figure 22:
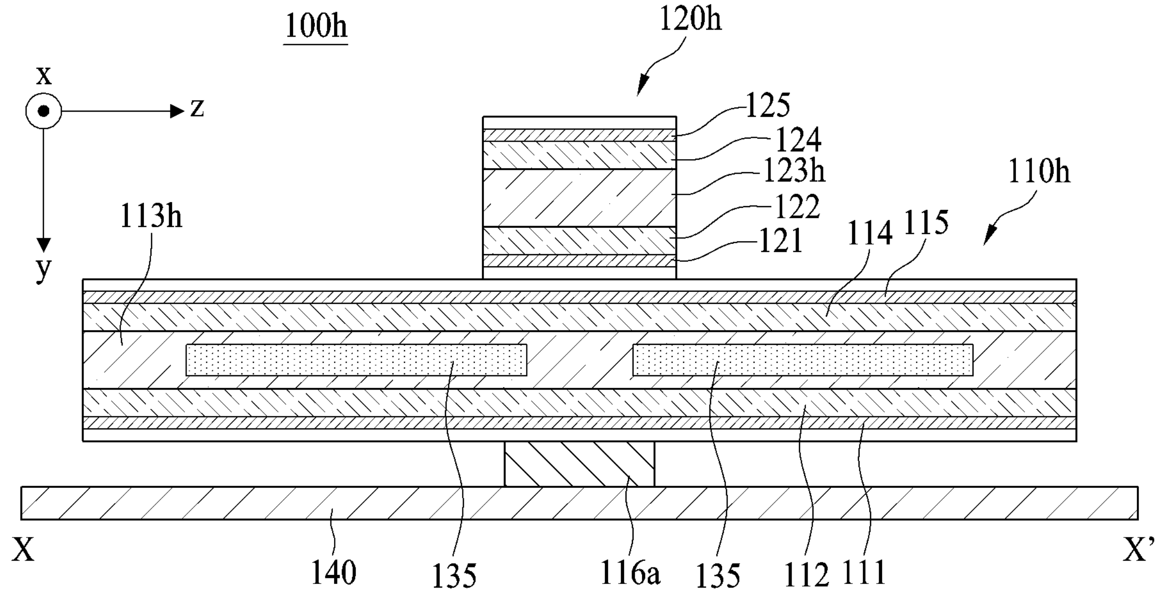
FIG. 22 is a cross-sectional view illustrating a structure of a sound generator according to an eighth modification aspect of the first aspect of the present disclosure.

FIG. 22 is a cross-sectional view illustrating a structure of a sound generator 100*h* according to an eighth modification aspect of the first aspect of the present disclosure. The sound generator 100*h* illustrated in FIG. 22 may include a first vibration device 110*h* and a second vibration device 120*h*. In that the first vibration device 110*h* includes an elastic supporting portion 116*a* instead of the elastic supporting portion 116 illustrated in FIG. 21, the first vibration device 110*h* may differ from the first vibration device 110*g* illustrated in FIG. 21, and the other elements may be the same as that of the first vibration device 110*g*.

The elastic supporting portion 116*a* may be disposed in a region overlapping all of the first vibration device 110*h* and the second vibration device 120*h*. For example, the elastic supporting portion 116*a* may be disposed between the first electrode 111 of the first vibration device 110*h* and the vibration plate 140. For example, the elastic supporting portion 116*a* may be disposed between a center portion of the first electrode 111 and the vibration plate 140. In that the elastic supporting portion 126 illustrated in FIG. 13 is not disposed at the second vibration device 120*h*, the second vibration device 120*h* may differ from the second vibration device 120*g*, and the other elements may be the same as that of the second vibration device 120*g*.

Figure 23:
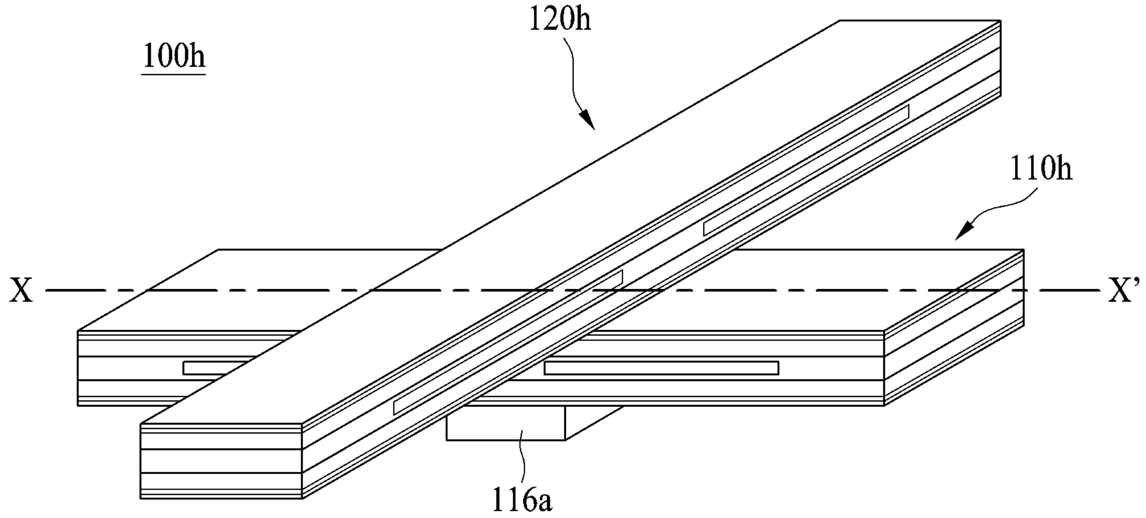
FIG. 23 is a perspective view illustrating the structure of the sound generator according to the eighth modification aspect of the first aspect of the present disclosure.

FIG. 23 is a perspective view illustrating the structure of the sound generator 100*h* according to the eighth modification aspect of the first aspect of the present disclosure. The sound generator 100*h* illustrated in FIG. 23 may include the first vibration device 110*h* and the second vibration device 120*h*. The first vibration device 110*h* may be attached at (or connected to) the vibration plate 140 through the elastic supporting portion 116*a*. According to a structure illustrated in FIGS. 22 and 23, the same effect as that of the structure illustrated in FIG. 21 may be obtained, but a phase of a sound may be opposite or reverse.

Figure 24:
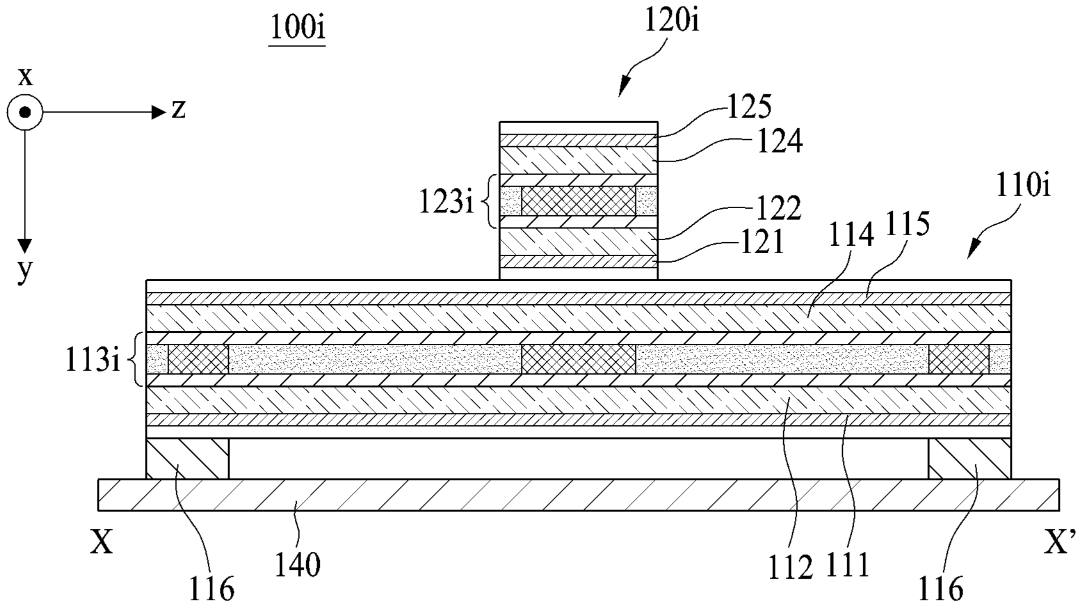
FIG. 24 is a cross-sectional view illustrating a structure of a sound generator according to a ninth modification aspect of the first aspect of the present disclosure.

FIG. 24 is a cross-sectional view illustrating a structure of a sound generator 100*i* according to a ninth modification aspect of the first aspect of the present disclosure. The sound generator 100*i* illustrated in FIG. 24 may include a first vibration device 110*i* and a second vibration device 120*i*.

In that the first vibration device 110*i* includes a second electrode 113*i*, the first vibration device 110*i* may differ from the first vibration device 110 illustrated in FIGS. 13 and 14 (or the first vibration device 110*g* illustrated in FIG. 21), and the other elements may be the same as that of the first vibration device 110*g*. The second electrode 113*i* will be described below in detail. In that the second vibration device 120*i* includes a second electrode 123*i*, the second vibration device 120*i* may differ from the second vibration device 120 illustrated in FIG. 14 (or the second vibration device 120*g* illustrated in FIG. 21), and the other elements may be the same as that of the second vibration device 120*g*. A structure illustrated in FIG. 24 may obtain the same effect as the structure illustrated in FIGS. 13 and 14. Also, a perspective view of the structure illustrated in FIG. 24 may refer to FIG. 13 and is omitted.

Figure 25:
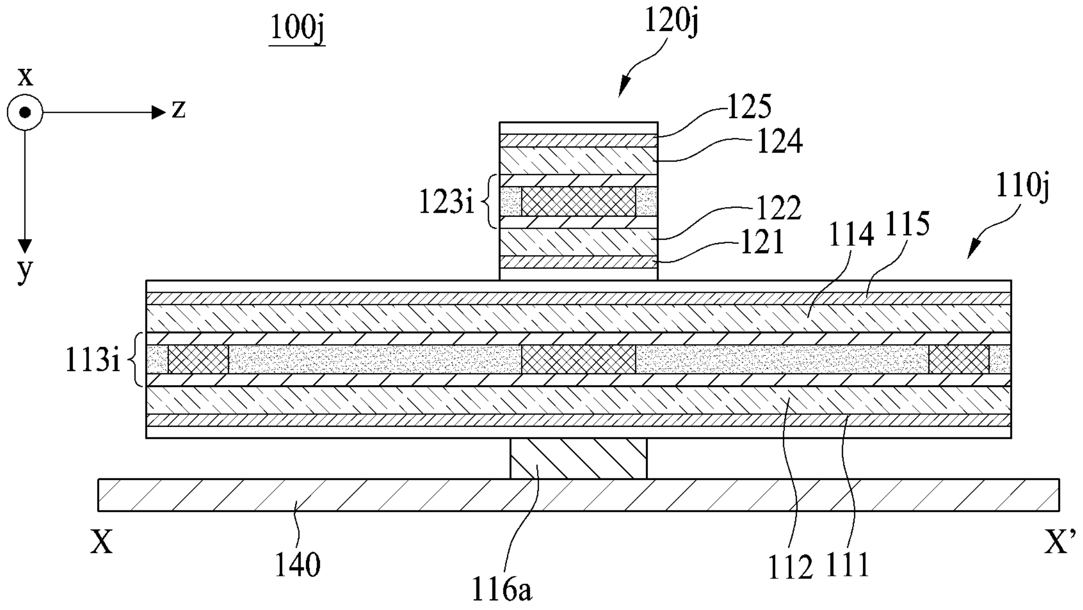
FIG. 25 is a cross-sectional view illustrating a structure of a sound generator according to a tenth modification aspect of the first aspect of the present disclosure.

FIG. 25 is a cross-sectional view illustrating a structure of a sound generator 100*j* according to a tenth modification aspect of the first aspect of the present disclosure. The sound generator 100*j* illustrated in FIG. 25 may include a first vibration device 110*j* and a second vibration device 120*j*. In that the first vibration device 110*j* includes an elastic supporting portion 116*a* instead of the elastic supporting portion 116, the first vibration device 110*j* may differ from the first vibration device 110*i* illustrated in FIG. 24, and the other elements may be the same as that of the first vibration device 110*i*. The elastic supporting portion 116*a* may be disposed at a region overlapping all of the first vibration device 110*j* and the second vibration device 120*j*. In that the elastic supporting portion 126 illustrated in FIG. 13 is not disposed at the second vibration device 120*j*, the second vibration device 120*j* may differ from the second vibration device 120*i* illustrated in FIG. 24, and the other elements may be the same as that of the second vibration device 120*i*.

Figure 26:
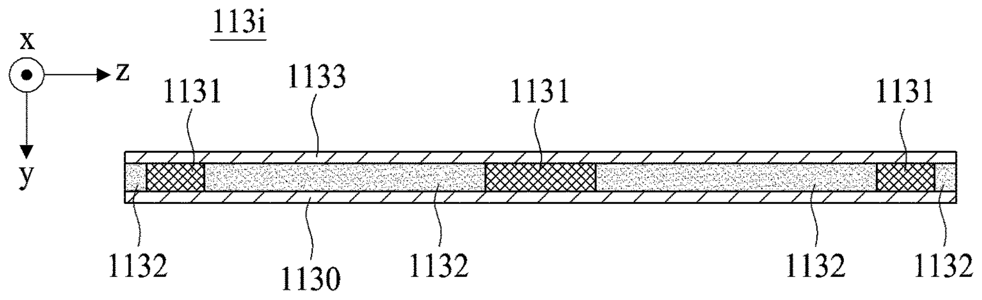
FIG. 26 is a diagram illustrating the second electrode illustrated in FIG. 24.

FIG. 26 is a diagram illustrating the second electrode 113*i* illustrated in FIG. 24. The second electrode 113*i* may include an electrode layer 1130 which is a fourth electrode, at least one weight member (or weight) 1131, an adhesive layer 1132, and an electrode layer 1133 which is a fifth electrode. The at least one weight member 1131 may be supported between the electrode layer 1130 and the electrode layer 1133 and may be electrically connected to the electrode layer 1130 and the electrode layer 1133. The adhesive layer 1132 may be disposed at a portion surrounded by the electrode layer 1130, the at least one weight member 1131, and the electrode layer 1133. For example, the adhesive layer 1132 may surround the at least one weight member 1131, between the electrode layer 1130 and the electrode layer 1133. For example, the at least one weight member 1131 may be surrounded by the adhesive layer 1132, between the electrode layer 1130 and the electrode layer 1133. For example, the at least one weight member 1131 disposed at each of the first vibration device 110*j* and the second vibration device 120*j* may be disposed at least one of a center portion and both end portions in a long-side direction in corresponding second electrodes 113*i* and 123*i*.

In an aspect or the first to eighth modification aspects of the present disclosure described above, the second electrode 113*i* may be manufactured by a process performed on a metal plate or the like (for example, a dicing process performed on a stainless plate). On the other hand, the second electrode 113*i* illustrated in FIG. 26 may include the adhesive layer 1132 which is filled into a gap space (or a gap) between two electrode layers 1130 and 1133 disposed with the at least one weight member 1131 therebetween, and thus, may be manufactured without undergoing a dicing process.

As described above with reference to FIG. 26, an aspect of a sound generator capable of being manufactured without undergoing a dicing process will be described below with reference to FIGS. 27A to 27D.

FIGS. 27A to 27D are cross-sectional views illustrating a structure of a modification aspect of the first and second vibration devices illustrated in FIGS. 24 to 26 and illustrate various structures for increasing a weight of each of the first and second vibration devices by modifying an internal structure of each of the first and second vibration devices. For example, each of a first vibration device 110*k* and a second vibration device 120*k* of a vibration portion may include an elastic adhesive layer which fixes at least one weight member to at least one weight member disposed near at least one piezoelectric layer, and thus, a weight may increase. This will be described below in detail.

Figure 27A:
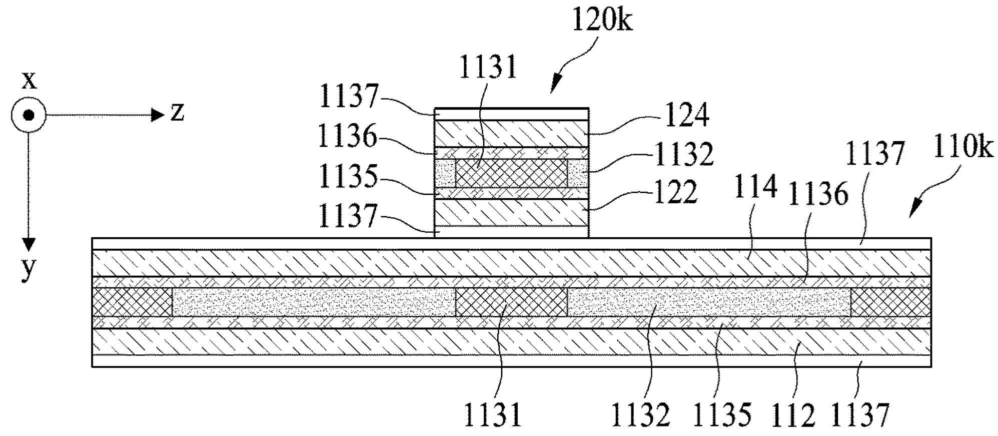
FIGS. 27A to 27D are cross-sectional views illustrating a structure of a modification aspect of the first and second vibration devices illustrated in FIGS. 24 to 26.

With reference to FIG. 27A, each of a first vibration device 110*k* and a second vibration device 120*k* of a vibration portion according to a first modification of the first aspect of the present disclosure may include at least one weight member 1131 and an elastic adhesive layer 1132, which are disposed two piezoelectric layers 112 and 114 which are stacked (or overlap). The elastic adhesive layer 1132 may be disposed at a portion, where the at least one weight member 1131 is not disposed, of a portion between two piezoelectric layers 112 and 114. Therefore, a weight of each of the first vibration device 110*k* and the second vibration device 120*k* may more increase.

Each of the first vibration device 110*k* and the second vibration device 120*k* of the vibration portion according to the first modification of the present disclosure may further include a first insulation plate 1135 and a second insulation plate 1136. The first insulation plate 1135 may be disposed between the piezoelectric layer 112 and the at least one weight member 1131. For example, the first insulation plate 1135 may include an electrode layer electrically connected to the piezoelectric layer 112, and thus, the first insulation plate 1135 may be a first electrode layer. The second insulation plate 1136 may be disposed between the piezoelectric layer 114 and the at least one weight member 1131. For example, the second insulation plate 1136 may include an electrode layer electrically connected to the piezoelectric layer 114, and thus, the second insulation plate 1136 may be a first electrode layer.

Each of the first vibration device 110*k* and the second vibration device 120*k* of the vibration portion according to the first modification of the present disclosure may further include first and second reinforcement plates 1135 and 1136, instead of the first and second insulation plates 1135 and 1136. Each of the first and second reinforcement plates 1135 and 1136 may be a vibrator which provide an elastic force to a bending motion of each of the piezoelectric layers 112 and 114 and may be used for increasing the stiffness of the piezoelectric layer 112. Each of the first and second reinforcement plates 1135 and 1136 may include a metal material, and for example, may include a stainless material. Each of the first and second reinforcement plates 1135 and 1136 may be used as an electrode layer of each of piezoelectric layers 112 and 114, and thus, the electrode layer formed at the piezoelectric layers 112 and 114 may be omitted or may not be omitted. For example, the first reinforcement plate 1135 may be a first electrode layer, and the second reinforcement plate 1136 may be a second electrode layer. A protection member (or an insulation layer) 1137 may be disposed at each of an outer portion (or a front surface) of the piezoelectric layer 112 and an outer portion (or a front surface) of the piezoelectric layer 114. Each of the protection members (or the insulation layers) 1137 may include an electrode layer electrically connected to the piezoelectric layers 112 and 114.

Figure 27B:
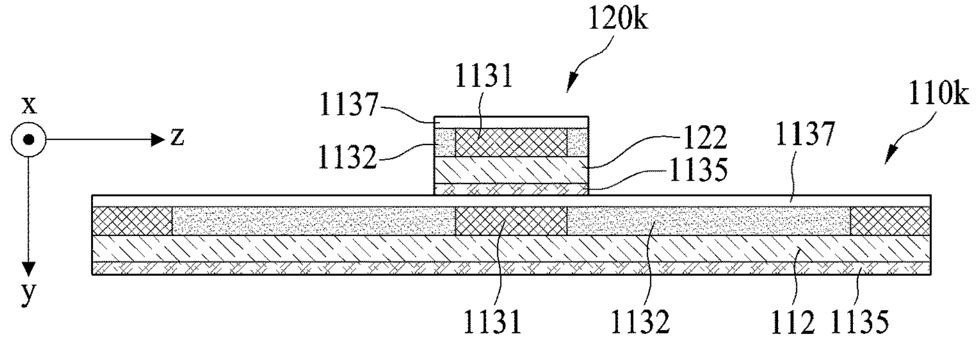

With reference to FIG. 27B, each of a first vibration device 110*k* and a second vibration device 120*k* of a vibration portion according to a second modification of the present disclosure may include at least one weight member 1131 and an elastic adhesive layer 1132, which are disposed a piezoelectric layer 112 and a protection member (or an insulation layer) 1137. The elastic adhesive layer 1132 may be disposed at a portion, where the at least one weight member 1131 is not disposed, of a portion between the piezoelectric layer 112 and the protection member 1137. Therefore, a weight of each of the first vibration device 110*k* and the second vibration device 120*k* may more increase.

Each of the first vibration device 110*k* and the second vibration device 120*k* according to the second modification of the present disclosure may further include an insulation plate 1135 disposed at a rear surface of the piezoelectric layer 112. The insulation plate 1135 may include an electrode layer electrically connected to the piezoelectric layer 112, and thus, the insulation plate 1135 may be an electrode layer. The insulation plate 1135 may be replaced with a reinforcement plate as described above with reference to FIG. 27A, and thus, its repeated description is omitted. Each of the first vibration device 110*k* and the second vibration device 120*k* of the vibration portion according to the second modification of the present disclosure may further include a protection member (or an insulation layer) 1137 disposed at an outer portion (or a front surface) of each of the at least one weight member 1131 and the elastic adhesive layer 1132.

Figure 27C:
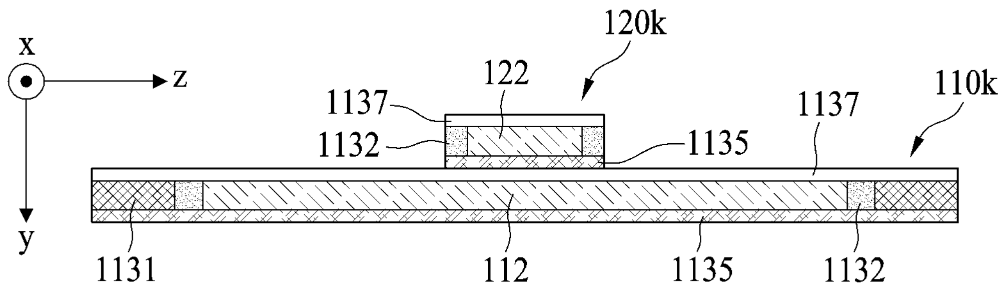

With reference to FIG. 27C, each of a first vibration device 110*k* and a second vibration device 120*k* of a vibration portion according to a third modification of the present disclosure may include two weight members 1131 disposed at both ends of a piezoelectric layer 112 and an elastic adhesive layer 1132 disposed between the both ends of the piezoelectric layer 112 and the two weight members 1131. For example, the two weight members 1131 may be respectively disposed at both ends of the piezoelectric layer 112 through an elastic adhesive layer 1132. Therefore, a weight of each of the first vibration device 110*k* and the second vibration device 120*k* may more increase. An insulation plate 1135 may be disposed at a rear surface of each of the elastic adhesive 1132 and the two weight members 1131. The insulation plate 1135 may include an electrode layer electrically connected to the piezoelectric layer 112, and thus, the insulation plate 1135 may be an electrode layer. The insulation plate 1135 may be replaced with a reinforcement plate as described above with reference to FIG. 27A, and thus, its repeated description is omitted. Each of the first vibration device 110*k* and the second vibration device 120*k* according to the third modification of the present disclosure may further include a protection member (or an insulation layer) 1137 disposed at an outer portion (or a front surface) of each of the piezoelectric layer 112, the at least one weight member 1131, and the elastic adhesive layer 1132. Each of the protection members (or the insulation layers) 1137 may include an electrode layer electrically connected to the piezoelectric layers 112 and 114.

Figure 27D:
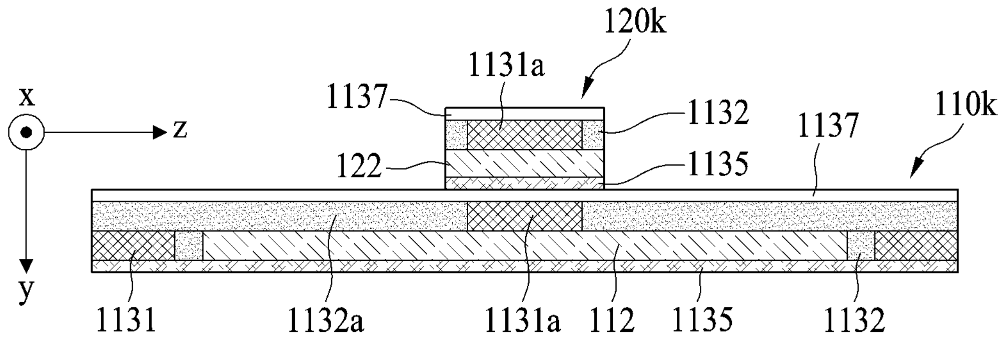

With reference to FIG. 27D, each of a first vibration device 110*k* and a second vibration device 120*k* of a vibration portion according to a fourth modification of the present disclosure may include two weight members 1131 disposed at both ends of the piezoelectric layer 112, an elastic adhesive layer 1132 disposed between both ends of the piezoelectric layer 112 and the two weight members 1131, and at least one other weight member 1131*a* disposed on the piezoelectric layer 112 and surrounded by another elastic adhesive layer 1132*a*. Therefore, a weight of each of the first vibration device 110*k* and the second vibration device 120*k* may more increase. For example, the at least one other weight member 1131*a* may be disposed on the piezoelectric layer 112, between the two weight members 1131. For example, the at least one other weight member 1131*a* may be disposed on a center portion, except a periphery portion, of the piezoelectric layer 112.

An insulation plate 1135 may be disposed at a rear surface of each of the piezoelectric layer 112, the two weight members 1131, and the elastic adhesive 1132. The insulation plate 1135 may include an electrode layer electrically connected to the piezoelectric layer 112, and thus, the insulation plate 1135 may be an electrode layer. The insulation plate 1135 may be replaced with a reinforcement plate as described above with reference to FIG. 27A, and thus, its repeated description is omitted. Each of the first vibration device 110*k* and the second vibration device 120*k* according to the fourth modification of the present disclosure may further include a protection member (or an insulation layer) 1137 disposed at a front surface of each of the piezoelectric layer 112, the two weight members 1131, and the elastic adhesive layer 1132. Each of the protection members (or the insulation layers) 1137 may include an electrode layer electrically connected to the piezoelectric layers 112 and 114.

FIGS. 28A to 28D are diagrams illustrating a connection structure between a sound generator and a vibration plate illustrated in FIGS. 27A to 27D.

With reference to FIGS. 28A to 28D, a sound generator including the first vibration device 110*k* and the second vibration device 120*k* of the vibration portion illustrated in each of FIGS. 27A to 27D may be connected to a vibration plate 140 through an elastic supporting portion 116. For example, the first vibration device 110*k* may be connected to the vibration plate 140 through the elastic supporting portion 116. For example, the elastic supporting portion 116 may be connected between the vibration plate 140 and both ends (or a periphery portion) of the first vibration device 110*k* in a long-side direction thereof. Also, the second vibration device 120*k* may be connected to the vibration plate 140 through the elastic supporting portion 116. For example, the elastic supporting portion 116 may be connected between the vibration plate 140 and both ends (or a periphery portion) of the second vibration device 120*k* in a long-side direction thereof. Also, the elastic supporting portion 116 may be connected between the vibration plate 140 and a center portion of the first vibration device 110*k* overlapping all of the first vibration device 110*k* and the second vibration device 120*k*.

FIGS. 29A to 29D are cross-sectional views illustrating a connection structure of another modification aspect between the first and second vibration devices of the vibration portion illustrated in FIGS. 24 to 26 and illustrate various structures for increasing a weight of each of the first and second vibration devices through an external structure material of the first and second vibration devices.

Figure 29A:
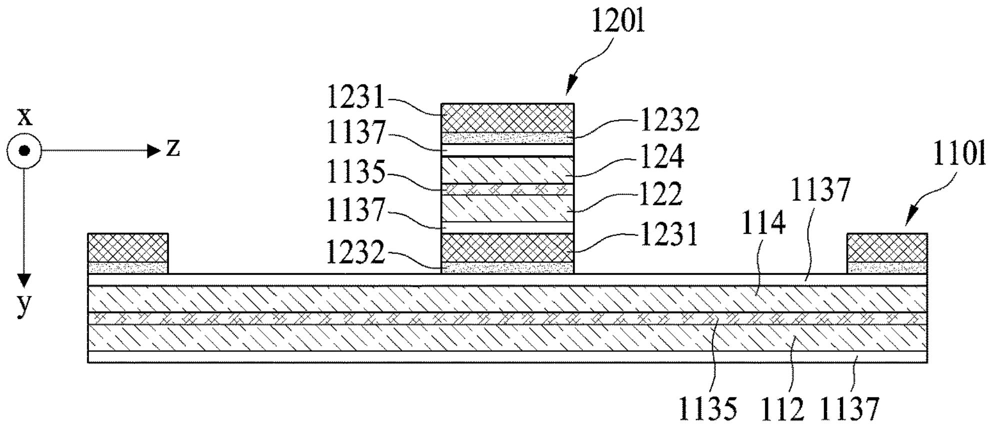
FIGS. 29A to 29D are cross-sectional views illustrating a connection structure of another modification aspect between the first and second vibration devices of the vibration portion illustrated in FIGS. 24 to 26.

With reference to FIG. 29A, each of a first vibration device 110*l* and a second vibration device 120*l* of a vibration portion according to a fourth modification of the present disclosure may include two piezoelectric layers 112 and 114, an insulation plate 1135 disposed between the two piezoelectric layers 112 and 114, and at least one weight member 1231 connected to an outer portion (or a front surface) of the piezoelectric layer 114 through an elastic adhesive layer 1232. The second vibration device 120*l* may be connected to the at least one weight member 1231 connected to the first vibration device 110*l*. For example, the at least one weight member 1231 may be disposed (or connected) between the first vibration device 110*l* and the second vibration device 120*l*. Therefore, a weight of each of the first vibration device 110*l* and the second vibration device 120*l* may more increase. The insulation plate 1135 may include an electrode layer electrically connected to the piezoelectric layers 112 and 114, and thus, the insulation plate 1135 may be an electrode layer. The insulation plate 1135 may be replaced with a reinforcement plate as described above with reference to FIG. 27A, and thus, its repeated description is omitted. A protection member (or an insulation layer) 1137 may be disposed at an outer portion of each of the piezoelectric layers 112 and 114. Each of the protection members (or the insulation layers) 1137 may include an electrode layer electrically connected to the piezoelectric layers 112 and 114. The at least one weight member 1231 may be connected to the protection member 1137, disposed at an outer portion of the piezoelectric layer 114, through the elastic adhesive layer 1232.

Figure 29B:
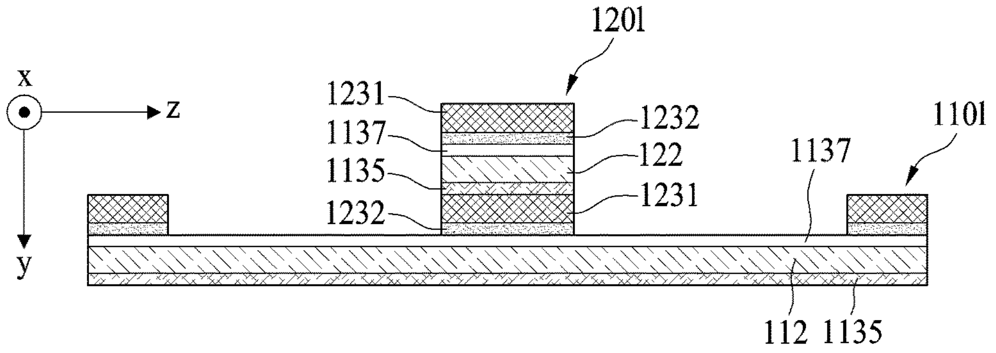

With reference to FIG. 29B, each of a first vibration device 110*l* and a second vibration device 120*l* of a vibration portion according to a fifth modification of the present disclosure may include one piezoelectric layer 112 and at least one weight member 1231 connected to an outer portion (or a front surface) of the one piezoelectric layer 112 through an elastic adhesive layer 1232. An insulation plate 1135 may be disposed at another outer portion (or a rear surface) of the one piezoelectric layers 112. The second vibration device 120*l* may be connected to the at least one weight member 1231 connected to the first vibration device 110*l*. For example, the at last one weight member 1231 may be disposed (or connected) between the first vibration device 110*l* and the second vibration device 120*l*. Therefore, a weight of each of the first vibration device 110*l* and the second vibration device 120*l* may more increase. The insulation plate 1135 may include an electrode layer electrically connected to the piezoelectric layer 112, and thus, the insulation plate 1135 may be an electrode layer. The insulation plate 1135 may be replaced with a reinforcement plate as described above with reference to FIG. 27A, and thus, its repeated description is omitted. A protection member (or an insulation layer) 1137 may be disposed at an outer portion of the one piezoelectric layer 112. The protection member (or the insulation layer) 1137 may include an electrode layer electrically connected to the one piezoelectric layer 112. The at least one weight member 1231 may be connected to the protection member 1137 through the elastic adhesive layer 1232.

Figure 29C:
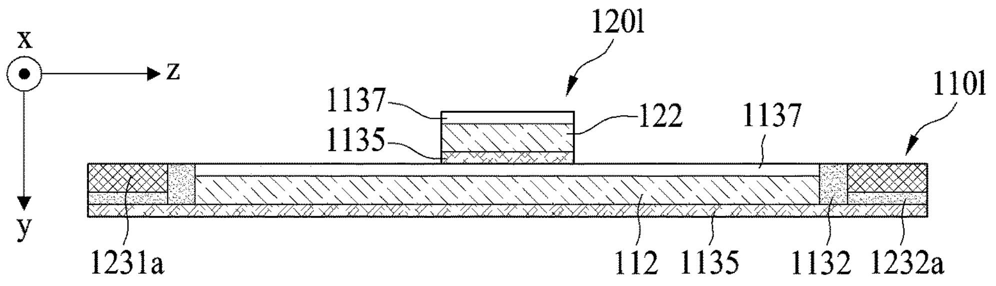

With reference to FIG. 29C, each of a first vibration device 110*l* and a second vibration device 120*l* of a vibration portion according to a sixth modification of the present disclosure may include one piezoelectric layer 112 and two weight members 1231*a* connected to both ends of the piezoelectric layer 112 through an elastic adhesive layer 1132. An insulation plate 1135 may be disposed at another outer portion (or a rear surface) of the one piezoelectric layer 112. The insulation plate 1135 may include an electrode layer electrically connected to the piezoelectric layer 112, and thus, the insulation plate 1135 may be an electrode layer. Each of the two weight members 1231*a* may be additionally connected to a periphery portion of the insulation plate 1135 through another elastic adhesive layer 1232*b*. The second vibration device 120*l* may be connected to the at least one weight member 1231 connected to the first vibration device 110*l*. For example, the two weight members 1231*a* may be disposed (or connected) between the first vibration device 110*l* and the second vibration device 120*l*. Therefore, a weight of each of the first vibration device 110*l* and the second vibration device 120*l* may more increase. The insulation plate 1135 may be replaced with a reinforcement plate as described above with reference to FIG. 27A, and thus, its repeated description is omitted. A protection member (or an insulation layer) 1137 may be disposed at an outer portion of the one piezoelectric layer 112. The protection member (or the insulation layer) 1137 may include an electrode layer electrically connected to the one piezoelectric layer 112.

Figure 29D:
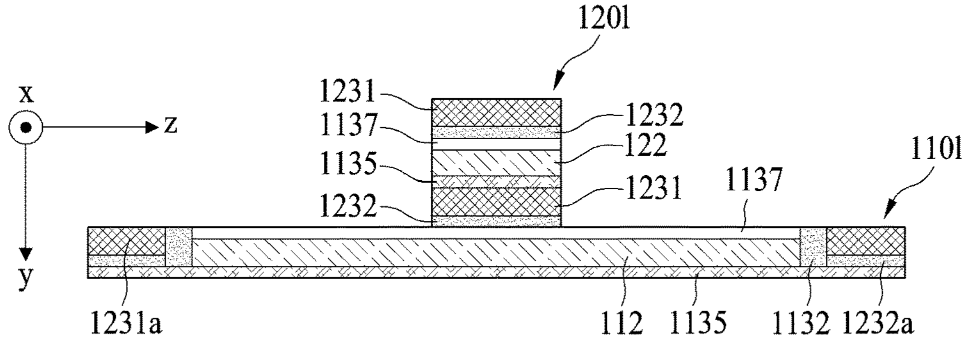

With reference to FIG. 29D, each of the first vibration device 110*l* and the second vibration device 120*l* of the vibration portion according to the sixth modification of the present disclosure may further include at least one weight member (or another weight member or a second weight member) connected to the protection member 1137 through the elastic adhesive layer 1232. The second vibration device 120*l* may be connected to the at least one weight member 1231 connected to the first vibration device 110*l*. For example, the at least one weight member 1231 may be disposed (or connected) between the first vibration device 110*l* and the second vibration device 120*l*. Accordingly, a weight of each of the first vibration device 110*l* and the second vibration device 120*l* may more increase.

Figure 30A:
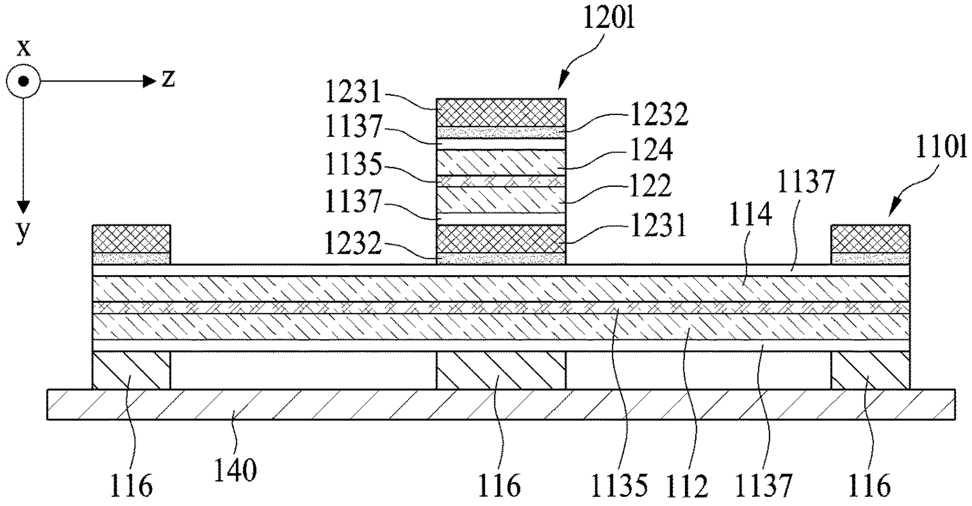
FIG. 30A is a diagram illustrating a connection structure between the sound generator and the vibration plate illustrated in FIG. 29A.
Figure 30B:
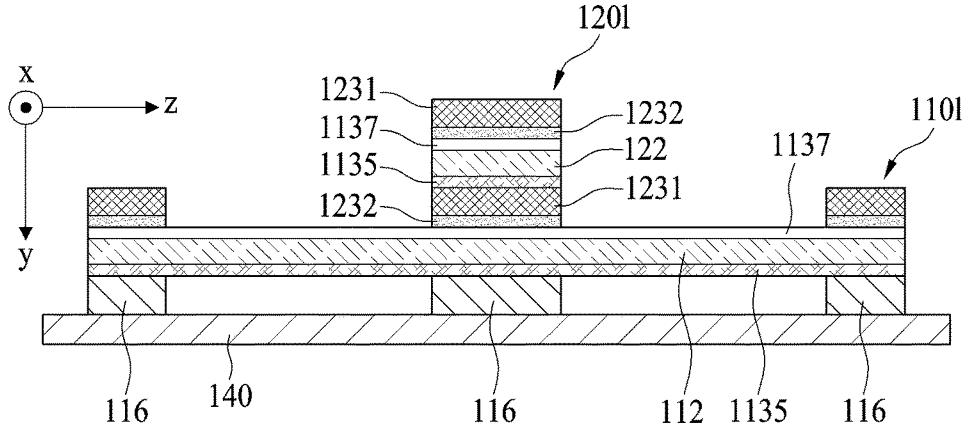
FIG. 30B is a diagram illustrating a connection structure between the sound generator and the vibration plate illustrated in FIG. 29B.

FIG. 30A is a diagram illustrating a connection structure between the sound generator and the vibration plate illustrated in FIG. 29A, and FIG. 30B is a diagram illustrating a connection structure between the sound generator and the vibration plate illustrated in FIG. 29B.

With reference to FIGS. 30A and 30B, a sound generator including the first vibration device 110*l* and the second vibration device 120*l* of the vibration portion illustrated in FIGS. 29A and 29B may be connected to a vibration plate 140 through an elastic supporting portion 116 as described above with reference to FIGS. 28A and 28B, and thus, its repeated description is omitted.

Figure 28A:
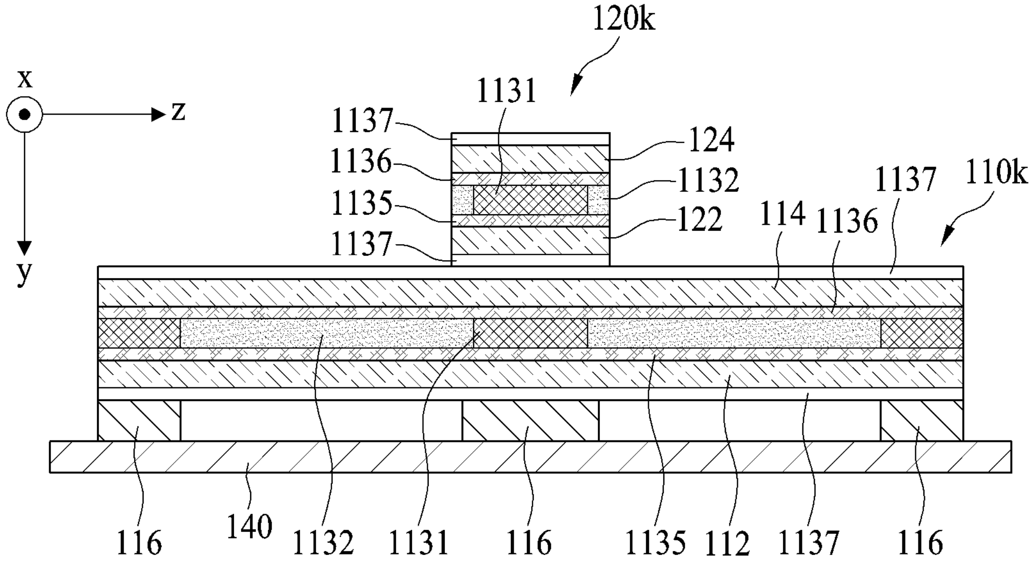
FIGS. 28A to 28D are diagrams illustrating a connection structure between a sound generator and a vibration plate illustrated in FIGS. 27A to 27D.
Figure 28B:
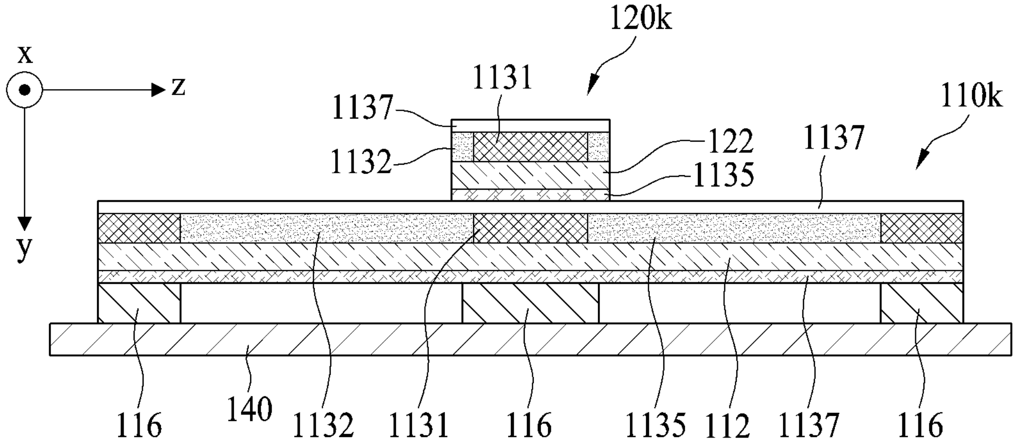
Figure 31A:
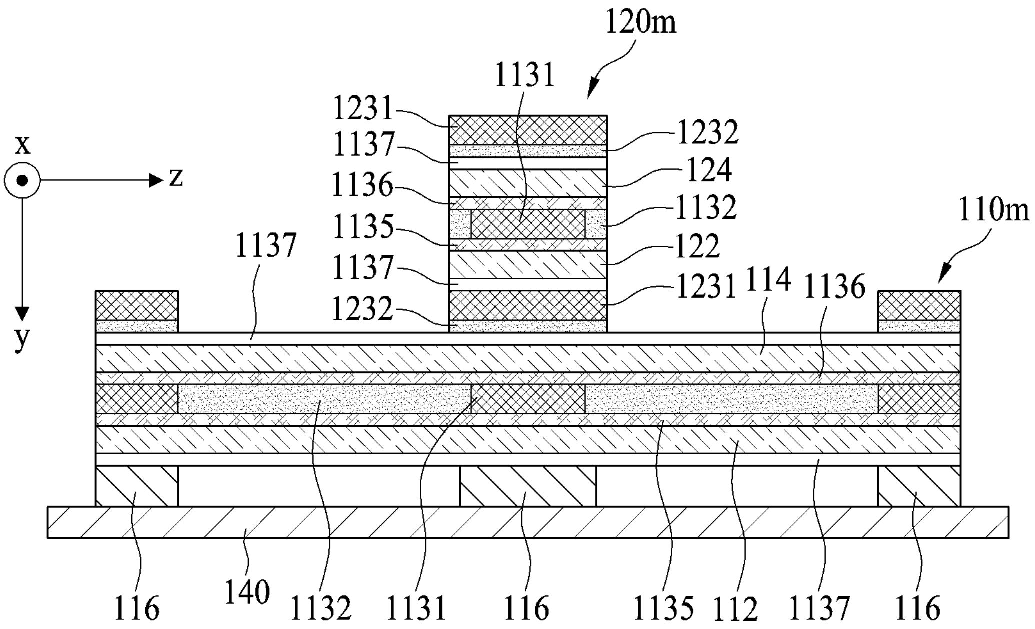
FIG. 31A is a diagram illustrating a modification aspect of the sound generator illustrated in FIG. 28A.
Figure 31B:
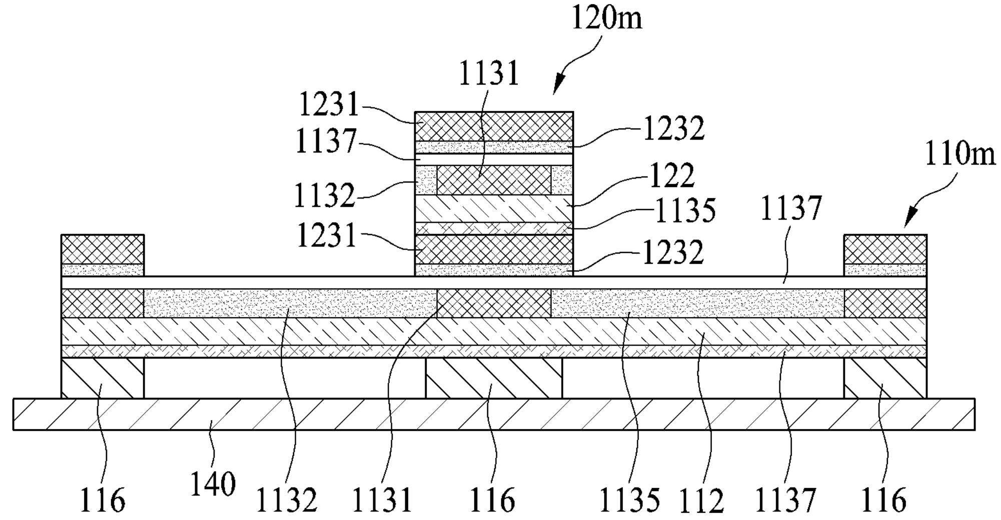
FIG. 31B is a diagram illustrating a modification aspect of the sound generator illustrated in FIG. 28B.
Figure 31C:
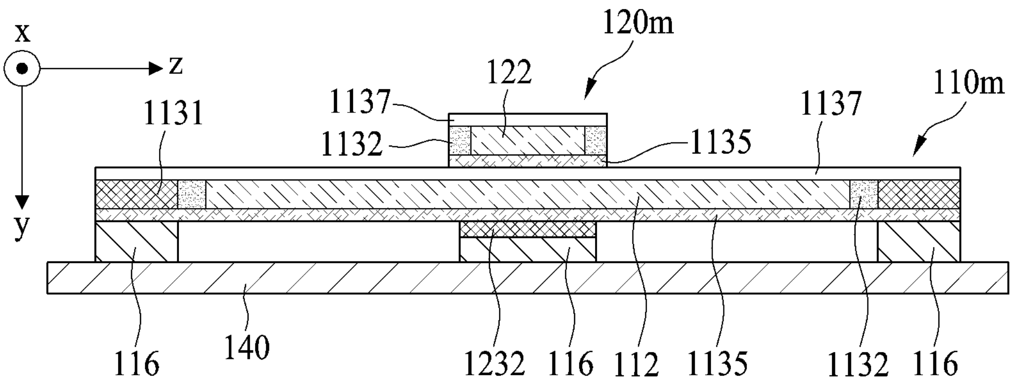
FIG. 31C is a diagram illustrating a modification aspect of the sound generator illustrated in FIG. 28C.

FIG. 31A is a diagram illustrating a modification aspect of the sound generator illustrated in FIG. 28A, and FIG. 31B is a diagram illustrating a modification aspect of the sound generator illustrated in FIG. 28B. FIG. 31C is a diagram illustrating a modification aspect of the sound generator illustrated in FIG. 28C With reference to FIGS. 31A and 31B, a sound generator illustrated in each of FIGS. 31A and 31B may differ from the sound generator illustrated in each of FIGS. 28A and 28B in that at least one weight member (or another weight member or a second weight member) 1231 is connected to an outer portion of each of a first vibration device 110*m* and a second vibration device 120*m*, and the other elements may be the same as that of the sound generator. For example, at least one weight member 1231 may be disposed at an outer portion of the first vibration device 110*m* through an elastic adhesive layer (or another adhesive layer or a second adhesive layer) 1232. Also, at least one weight member 1231 may be disposed at an outer portion of the second vibration device 120*m* through the elastic adhesive layer (or the other adhesive layer or the second adhesive layer) 1232. For example, the at least one weight member 1231 connected to the outer portion of the first vibration device 110*m* may overlap the at least one weight member 1231 connected to the outer portion of the second vibration device 120*m*.

Accordingly, a weight of each of the first vibration device 110*m* and the second vibration device 120*m* may more increase.

Figure 28C:
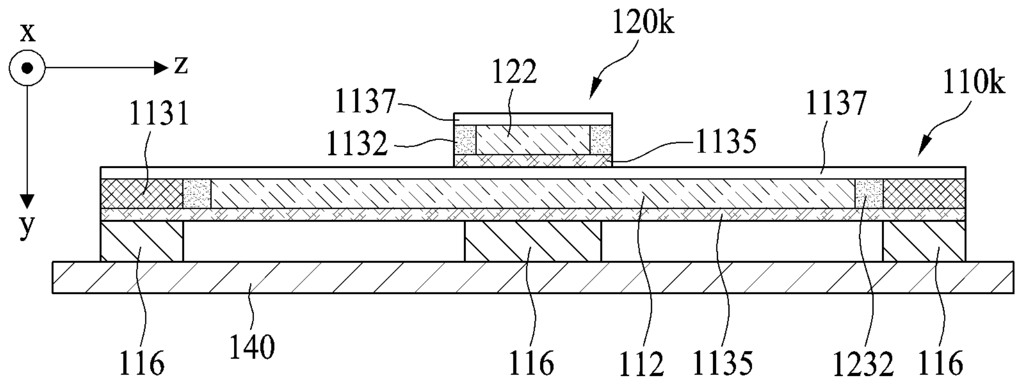
Figure 28D:
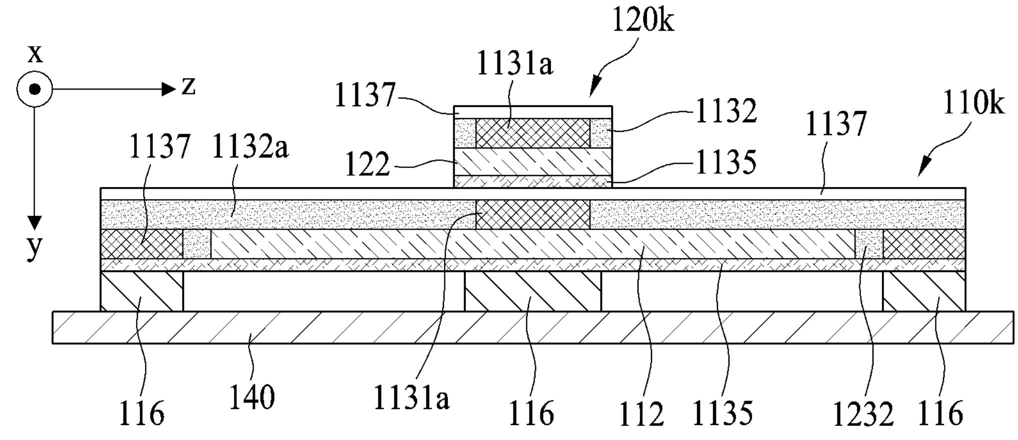

FIG. 31C is a diagram illustrating a connection structure between the sound generator and the vibration plate illustrated in FIG. 28C. With reference to FIG. 31C, a sound generator illustrated in each of FIG. 31C may differ from the sound generator illustrated in each of FIG. 28C in that at least one weight member (or another weight member or a second weight member) 1231 is further disposed at an elastic supporting portion 116, and the other elements may be the same as that of the sound generator. For example, the at least one weight member 1231 may be disposed between a piezoelectric layer 112 and the elastic supporting portion 116. For example, the at least one weight member 1231 may be connected to an insulation plate 1135 through an elastic adhesive layer (or another adhesive layer or a second adhesive layer). For example, the at least one weight member 1231 may be disposed between the elastic supporting portion 116 and a center of the first vibration device 110*m* overlapping all of the first vibration device 110*m* and the second vibration device 120*m*. For example, the at least one weight member 1231 may be disposed between the elastic supporting portion 116 and a center of the insulation plate 1135 of the first vibration device 110*m* overlapping all of the first vibration device 110*m* and the second vibration device 120*m*.

Figure 32A:
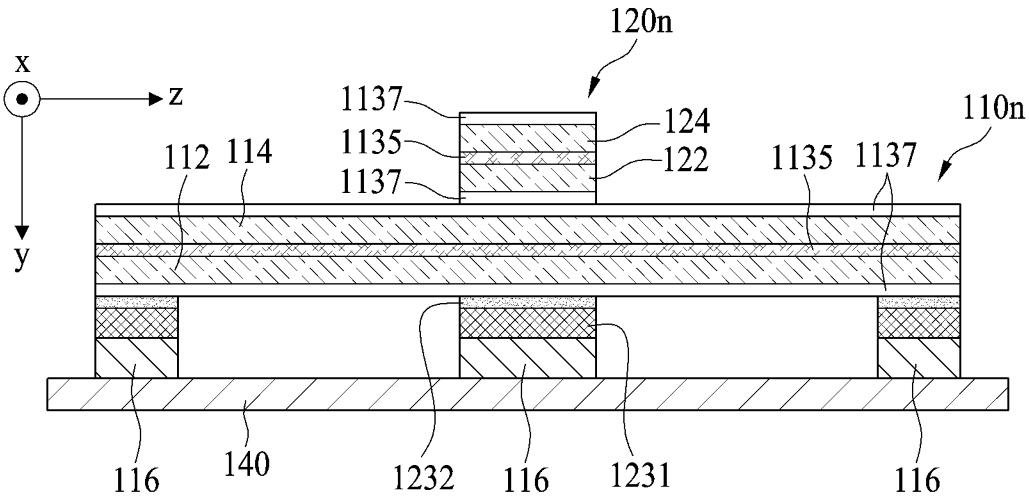
FIG. 32A is a diagram illustrating a modification aspect of the sound generator illustrated in FIG. 30A.

FIG. 32A is a diagram illustrating a modification aspect of the sound generator illustrated in FIG. 30A. A sound generator illustrated in FIG. 32A may differ from the sound generator illustrated in FIG. 30A in that at least one weight member 1231 is connected to an elastic supporting portion 116, and the other elements may be the same as that of the sound generator. Hereinafter, therefore, only the at least one weight member 1231 and the elastic supporting portion 116 will be briefly described.

The at least one weight member 1231 may be connected to an outer portion of a first vibration device 110*n* through an elastic adhesive layer 1232. For example, the at least one weight member 1231 may be connected to both end portions (or a periphery portion) of the first vibration device 110*k* in a long-side direction thereof through the adhesive layer 1232. For example, the at least one weight member 1231 may be connected to both end portions (or a periphery portion) of a second vibration device 120*n* in a long-side direction thereof through the adhesive layer 1232. The at least one weight member 1231 may be connected to a vibration plate 140 through the elastic supporting portion 116. For example, the at least one weight member 1231 may be connected to a center portion of the first vibration device 110*k* overlapping all of the first vibration device 110*k* and the second vibration device 120*k* through the adhesive layer 1232.

The elastic supporting portion 116 may be connected between the vibration plate 140 and the at least one weight member 1231 disposed at both end portions (or a periphery portion) of the first vibration device 110*n* in a long-side direction thereof. The elastic supporting portion 116 may be connected between the vibration plate 140 and the at least one weight member 1231 disposed at both end portions (or a periphery portion) of the second vibration device 120*n* in a long-side direction thereof. Also, the elastic supporting portion 116 may be connected between the vibration plate 140 and the at least one weight member 1231 disposed at a center portion of the first vibration device 110*n* overlapping all of the first vibration device 110*n* and the second vibration device 120*n*. Accordingly, a weight of each of the first vibration device 110*n* and the second vibration device 120*n* may more increase.

Figure 32B:
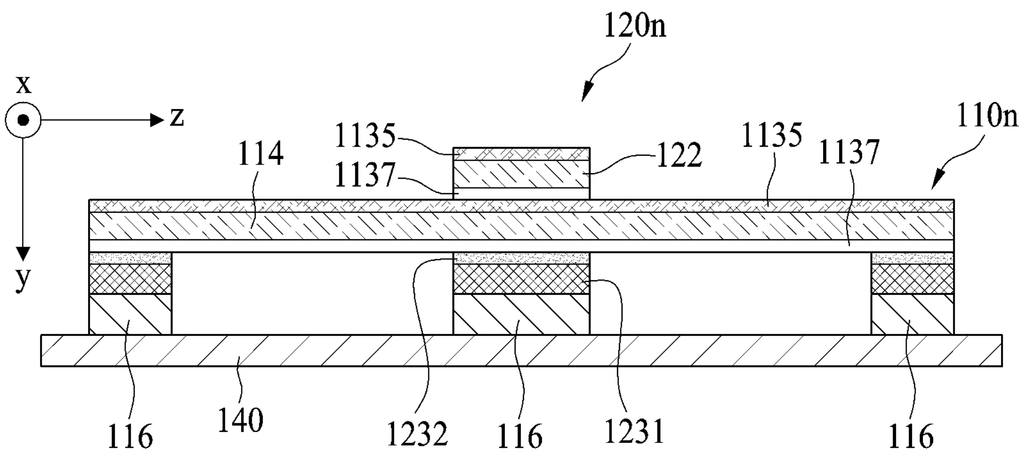
FIG. 32B is a diagram illustrating a modification aspect of the sound generator illustrated in FIG. 30B.

FIG. 32B is a diagram illustrating a modification aspect of the sound generator illustrated in FIG. 30B. A sound generator illustrated in FIG. 32B may differ from the sound generator illustrated in FIG. 30B in that at least one weight member 1231 is connected to an elastic supporting portion 116, and the other elements may be the same as that of the sound generator. The at least one weight member 1231 and the elastic supporting portion 116 may be substantially the same as the at least one weight member 1231 and the elastic supporting portion 116 illustrated in FIG. 32A, and thus, their repeated descriptions are omitted.

Figure 32C:
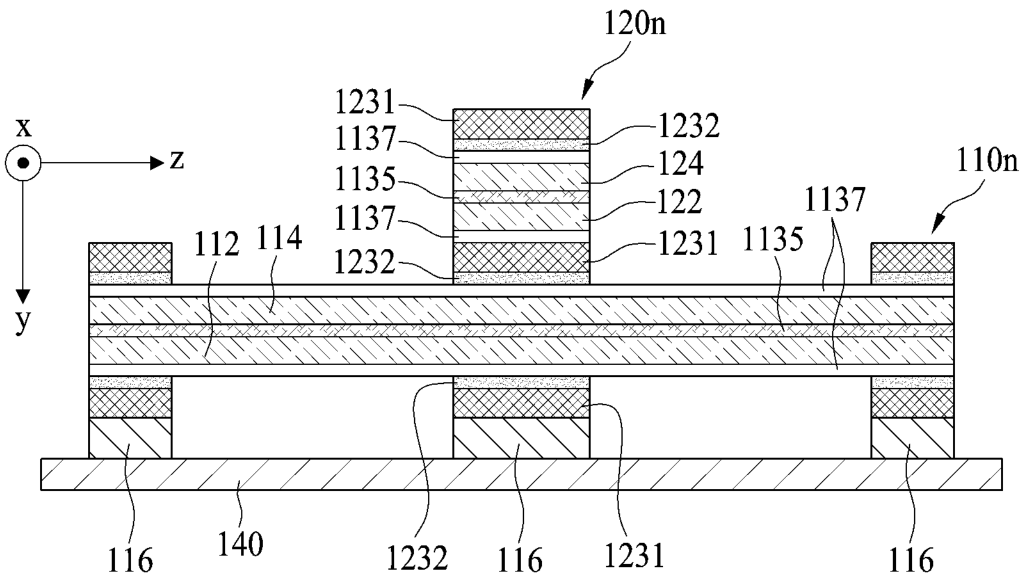
FIG. 32C is a diagram illustrating another modification aspect of the sound generator illustrated in FIG. 30A.

FIG. 32C is a diagram illustrating another modification aspect of the sound generator illustrated in FIG. 30A. A vibration portion or a sound generator illustrated in FIG. 32C may differ from the sound generator illustrated in FIG. 30A in that at least one weight member 1231 is further disposed between a first vibration device 110*n* and an elastic supporting portion 116, and the other elements may be the same as that of the sound generator. The at least one weight member 1231 and the elastic supporting portion 116 may be substantially the same as the at least one weight member 1231 and the elastic supporting portion 116 illustrated in FIG. 32A, and thus, their repeated descriptions are omitted.

As described above, according to the first aspect of the present disclosure, a sound pressure level and sound quality of a sound generated by a sound generator may be enhanced, thereby providing a sound apparatus having enhanced sound quality and sound pressure level. Also, according to the first aspect of the present disclosure, a sound having enhanced sound quality may be generated or output from the vibration plate 140 disposed at both surfaces of the sound generator, thereby providing an apparatus or a sound apparatus having enhanced sound quality and sound pressure level.

<Second Aspect>

An aspect of a vibration apparatus (or a sound module or a sound apparatus) including (or modularization) an element (or a sound generator) described above in the first aspect of the present disclosure will be described.

Figure 33:
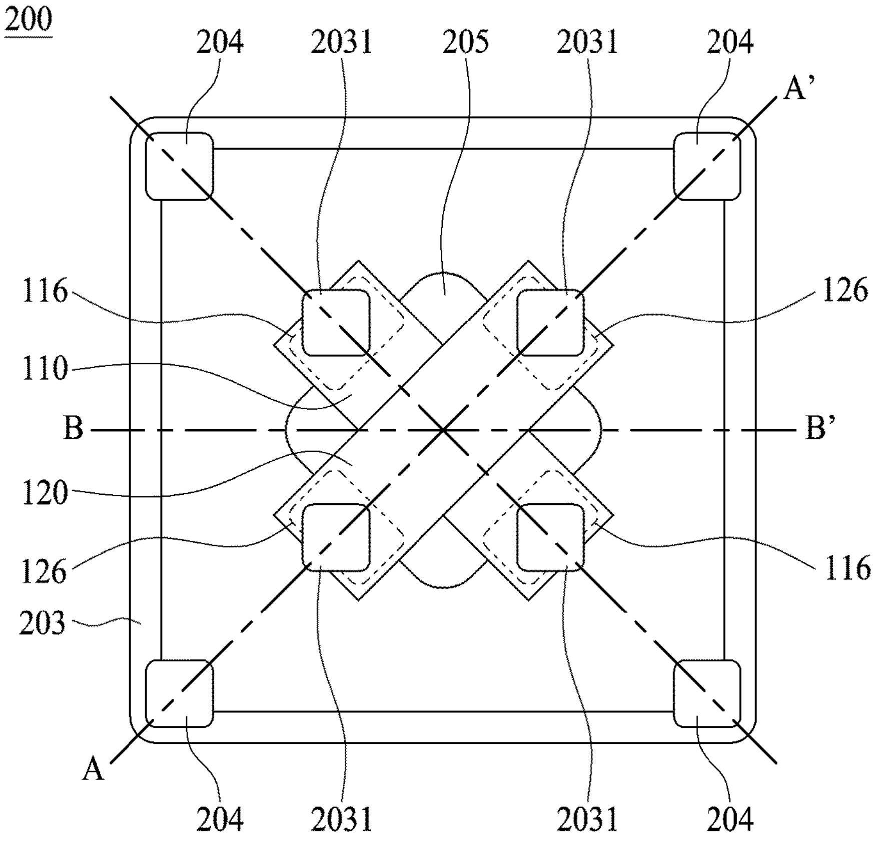
FIG. 33 is a plan view illustrating a vibration apparatus according to an aspect of the present disclosure.
Figure 34:
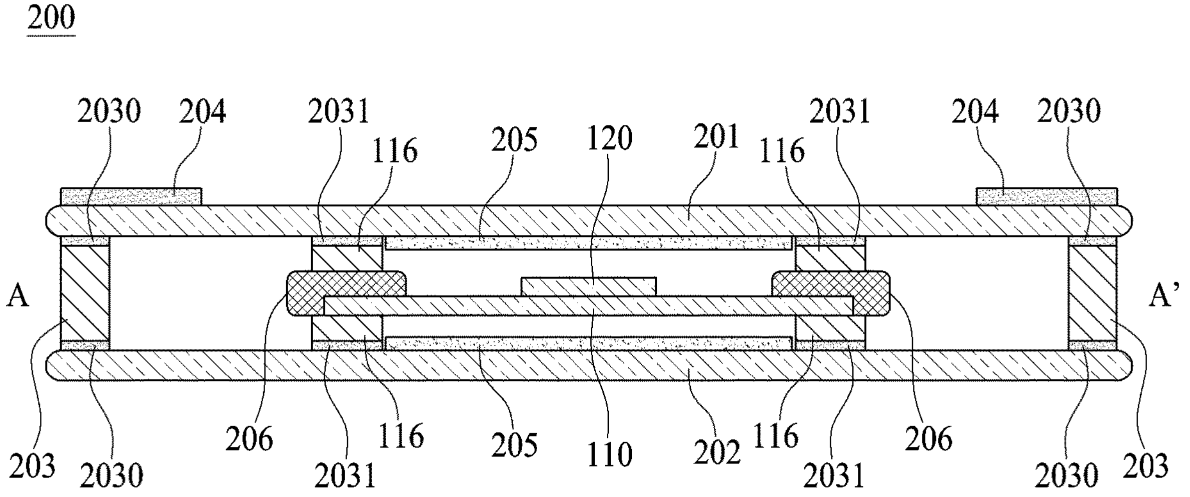
FIG. 34 is a cross-sectional view taken along line A-A' illustrated in FIG. 33.
Figure 35:
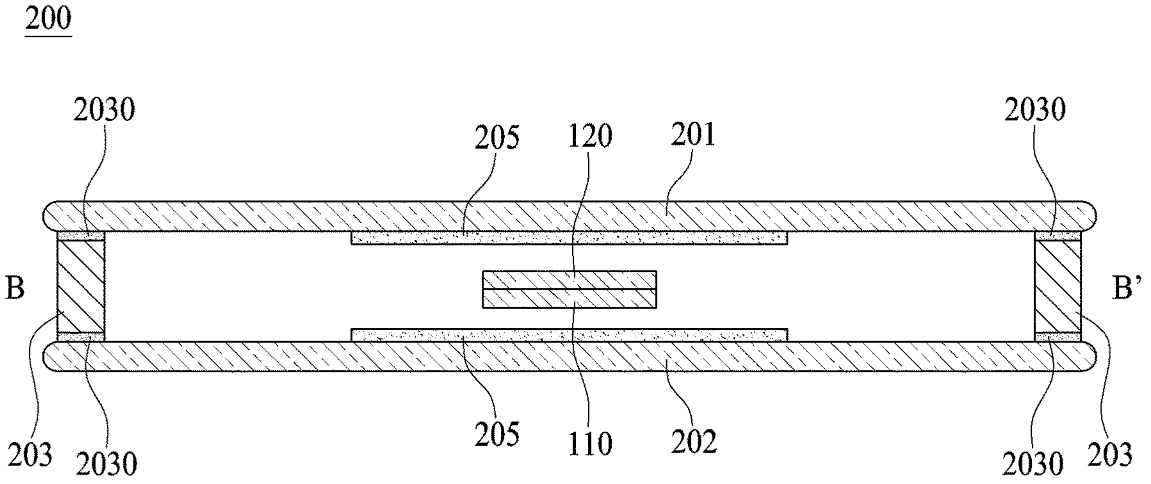
FIG. 35 is a cross-sectional view taken along line B-B' illustrated in FIG. 33.

FIG. 33 is a plan view illustrating a vibration apparatus (or a sound apparatus) 200 according to an aspect of the present disclosure. FIG. 33 is a plan view illustrating a configuration of a vibration apparatus (or a sound module or a sound apparatus) 200 including a first vibration device 110 and a second vibration device 120. FIG. 34 is a cross-sectional view taken along line A-A' illustrated in FIG. 33. FIG. 35 is a cross-sectional view taken along line B-B' illustrated in FIG. 33.

With reference to FIGS. 33 to 35, the vibration apparatus (or the sound module or the sound apparatus) 200 according to an aspect of the present disclosure may include a front cover plate 201, a back cover plate 202, a side cover plate 203, and a sound generator including the first vibration device 110 and the second vibration device 120.

The front cover plate 201 and the back cover plate 202 may be respectively disposed at two main surfaces (or a first surface and a second surface) of the vibration apparatus 200. For example, the front cover plate 201 may be disposed at the first surface of the two main surfaces of the vibration apparatus, and the back cover plate 202 may be disposed at the second surface of the two main surfaces of the vibration apparatus. For example, the front cover plate 201 may face the back cover plate 202. For example, the front cover plate 201 may be a first cover, a first cover member, a front cover, a front vibration member, a front vibration plate, or a first vibration plate. For example, the back cover plate 202 may be a second cover, a second cover member, a back cover, a back vibration member, a back vibration plate, or a second vibration plate.

The side cover plate 203 may be an external frame 203 which is disposed between the front cover plate 201 and the back cover plate 202 to surround a sound generator. For example, the external frame 203 may be disposed between a periphery portion of the front cover plate 201 and a periphery portion of the back cover plate 202. The external frame 203 may be connected to (or attached on) the front cover plate 201 and the back cover plate 202 through an internal adhesive member 2030. For example, the external frame 203 may be disposed at the periphery portion of the front cover plate 201 and the periphery portion of the back cover plate 202 through the internal adhesive member 2030. Also, an external adhesive member 204 for connecting (or attaching) the front cover plate 201 and the back cover plate 202 to an external mechanism (or an apparatus) may be disposed outside at least one of the front cover plate 201 and the back cover plate 202.

The sound generator may include the same elements as those of the sound generator illustrated in FIGS. 13 to 32 described above in the first aspect of the present disclosure. The sound generator may be disposed at a space between the front cover plate 201 and the back cover plate 202. The first vibration device 110 and the second vibration device 120 of the sound generator may be disposed at a space between the front cover plate 201 and the back cover plate 202. An elastic supporting portion 116 attached on (or connected to) the front cover plate 201 and the back cover plate 202 through an internal adhesive member 2031 may be disposed at the first vibration device 110. For example, the elastic supporting portion 116 may be connected between an extension portion of the first vibration device 110 and each of the front cover plate 201 and the back cover plate 202. An elastic supporting portion 126 attached on (or connected to) the front cover plate 201 and the back cover plate 202 through the internal adhesive member 2031 may be disposed at the second vibration device 120. For example, the elastic supporting portion 126 may be connected between an extension portion of the second vibration device 120 and each of the front cover plate 201 and the back cover plate 202.

Moreover, a weight member 206 may be disposed at both ends of the first vibration device 110 in a long-side direction thereof, and thus, a mass of the both ends of the first vibration device 110 may increase. Also, although not shown, a weight member may be disposed at both ends of the second vibration device 120 in a long-side direction thereof, and thus, a mass of the both ends of the second vibration device 120 may increase. According to the second aspect of the present disclosure, when each of the first vibration device 110 and the second vibration device 120 includes the weight member described above in the first aspect of the present disclosure, because a mass of the both ends of each of the first vibration device 110 and the second vibration device 120 is increased by the weight member, the weight member 206 illustrated in FIG. 34 may not be disposed, but aspects of the present disclosure are not limited thereto. For example, the weight member 206 illustrated in FIG. 34 may be a soldering portion configured for a line connection.

The vibration apparatus (or the sound module) 200 according to an aspect of the present disclosure may further include an absorption member 205. The absorption member 205 may be disposed at a space between the front cover plate 201 and the second vibration device 120 and may be disposed at a space between the back cover plate 202 and the first vibration device 110. The absorption member 205 may be configured to prevent a physical collision (or contact) between the first vibration device 110 and the front cover plate 201 or to prevent a physical collision (or contact) between the second vibration device 120 and the back cover plate 205. For example, the absorption member 205 may be an absorption agent or a cushion agent. In the vibration apparatus (or the sound module) 200 according to the second aspect of the present disclosure, a sound pressure level of a low sound may be enhanced by the absorption member 205.

Figure 36A:
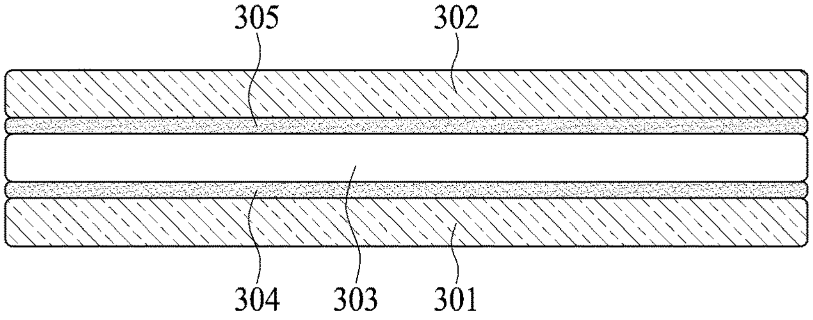
FIG. 36A is a cross-sectional view illustrating a layer structure between a front cover plate and a back cover plate according to an aspect of the present disclosure.
Figure 36B:
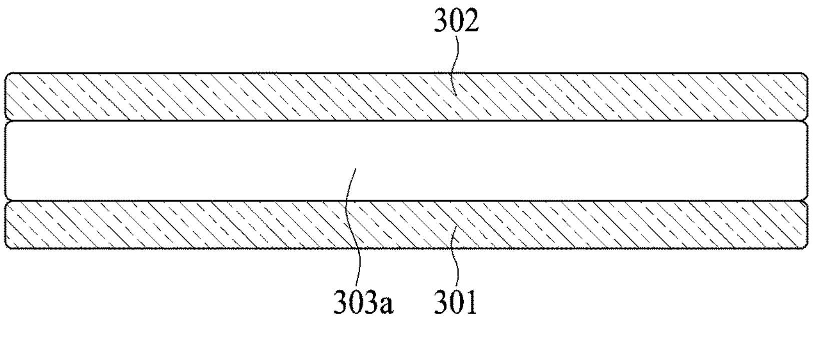
FIG. 36B is a cross-sectional view illustrating a layer structure between a front cover plate and a back cover plate according to another aspect of the present disclosure.

FIG. 36A is a cross-sectional view illustrating a layer structure between a front cover plate 201 and a back cover plate 202 according to an aspect of the present disclosure, and FIG. 36B is a cross-sectional view illustrating a layer structure between a front cover plate 201 and a back cover plate 202 according to another aspect of the present disclosure. At least one of the front cover plate 201 and the back cover plate 202 may be implemented by a composite material.

With reference to FIG. 36A, at least one of the front cover plate 201 and the back cover plate 202 according to an aspect of the present disclosure may include a first external protection member 301, a second external protection member 302, an elastic member 303, and first and second adhesive layers 304 and 305. The elastic member 303 may be disposed between the first external protection member 301 and the second external protection member 302. The first external protection member 301 and the second external protection member 302 may support the elastic member 303. The first adhesive layer 304 may attach (or connect) the first external protection member 301 to the elastic member 303. The second adhesive layer 305 may attach (or connect) the second external protection member 302 to the elastic member 303.

With reference to FIG. 36B, each of the front cover plate 201 and the back cover plate 202 according to another aspect of the present disclosure may include a first external protection member 301, a second external protection member 302, and an elastic member 303*a*. The elastic member 303*a* may be disposed between the first external protection member 301 and the second external protection member 302. The elastic member 303*a* may be configured to attach (or connect) the first external protection member 301 and the second external protection member 302 to each other.

In FIGS. 36A and 36B, the external protection members 301 and 302 may include, for example, a plastic material, but aspects of the present disclosure are not limited thereto. The elastic members 303 and 303*a* may include, for example, a sponge material, but aspects of the present disclosure are not limited thereto. For example, the elastic members 303 and 303*a* may include an elastomer. The adhesive layers 304 and 305 may include, for example, an optical adhesive silicon material. The external protection members 301 and 302 may be a resin plate having lower elasticity than that of the elastic member 303 and 303*a* and may be an elastic member where deformation caused by a stress is small.

As illustrated in FIG. 36B, in a case where each of two external protection members 301 and 302 may be attached at (or connected to) or directly attached at (or connected to) the elastic member 303*a*, each of the two external protection members 301 and 302 may be attached on (or connected to) or directly attached at (or connected to) the elastic member 303*a*. On the other hand, as illustrated in FIG. 36A, in a case where each of the two external protection members 301 and 302 may not be attached on (or connected to) or directly attached at (or connected to) the elastic member 303*a*, each of the two external protection members 301 and 302 may be indirectly attached at (or connected to) the elastic member 303*a* through the adhesive layers 304 and 305. As described above, the front cover plate 201 and the back cover plate 202 may be formed or implemented by a composite material.

Figure 37:
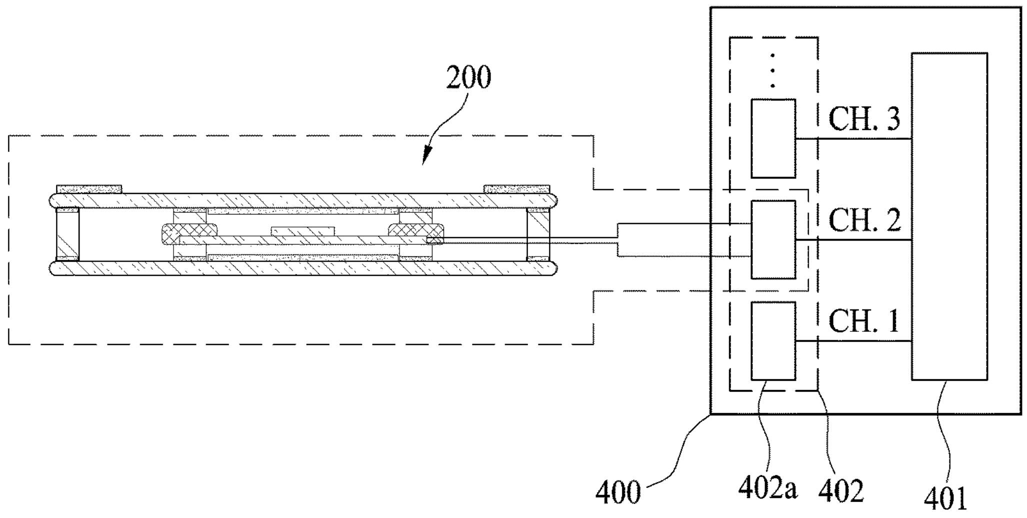
FIG. 37 is a diagram illustrating a driving circuit of a sound apparatus according to an aspect of the present disclosure.

FIG. 37 is a diagram illustrating a driving circuit of a sound apparatus according to an aspect of the present disclosure. FIG. 37 is a schematic diagram illustrating an apparatus including an amplifier board 400 and a vibration apparatus (or a sound module) 200 connected to the amplifier board 400.

The amplifier board 400 which is a driving circuit of a sound apparatus may include a preamplifier 401 and a plurality of amplifiers 402. A sound signal may be input from the outside and may be amplified by the preamplifier 401, and a signal amplified by the preamplifier 401 may be additionally amplified by one of the plurality of amplifiers 402 and may be supplied to the vibration apparatus 200.

In FIG. 37, three amplifiers included in the plurality of amplifiers 402 are illustrated, and the three amplifiers may be respectively distributed to channels. Each of the three amplifiers may amplify a sound signal based on a corresponding channel. For example, one amplifier may be configured to drive one vibration apparatus 200, but aspects of the present disclosure are not limited thereto.

Figure 38:
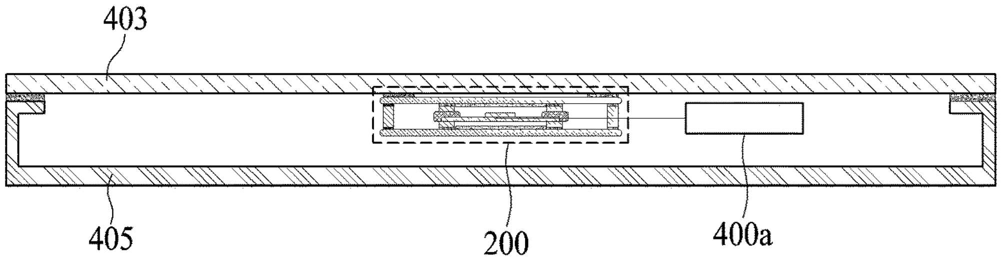
FIG. 38 is a diagram illustrating a driving circuit of a sound apparatus according to a first aspect of the present disclosure.

FIG. 38 is a diagram illustrating a driving circuit of a sound apparatus according to a first aspect of the present disclosure. FIG. 38 is a schematic diagram illustrating an apparatus including an amplifier board 400*a* and a vibration apparatus (or a sound module) 200 connected to the amplifier board 400*a*.

The apparatus according to the first aspect of the present disclosure may include a vibration member 403, a vibration apparatus (or a sound module) 200, and a case 405.

The vibration member 403 according to an aspect of the present disclosure may be the vibration plate 140 illustrated in one of FIGS. 14 to 32C. For example, the vibration member 403 may include a plastic material, but aspects of the present disclosure are not limited thereto and may be a vibration plate including a paper material or a glass material. The vibration member 403 according to another aspect of the present disclosure may be a display panel of a display apparatus or a vibration plate of a sound speaker.

The vibration apparatus 200 may be attached on (or connected to) the vibration member 403. The vibration apparatus 200 according to an aspect of the present disclosure may include a sound generator illustrated in one of FIGS. 14 to 32C and may be attached at (or connected to) the vibration member 403 through the elastic supporting portion 116. The vibration apparatus 200 according to another aspect of the present disclosure may be a vibration apparatus (or a sound module) described above with reference to FIGS. 33 to 36B and may be attached at (or connected to) the vibration member 403 through the external adhesive member 204.

The vibration apparatus 200 may vibrate based on a signal amplified and supplied by the amplifier board 400*a* to generate a sound and may transfer a generated vibration to the vibration member 403, and thus, may vibrate the vibration member 403 to generate a sound. The apparatus illustrated in FIG. 38 may include one vibration apparatus 200, and thus, may generate or output a monaural sound.

A case 405 may be attached at (or connected to) a rear surface periphery portion of the vibration member 403 to surround the vibration apparatus 200. The case 405 may protect the vibration apparatus 200 and may support the rear surface periphery portion of the vibration member 403. For example, the case 405 may be an enclosure or a housing.

Figure 39:
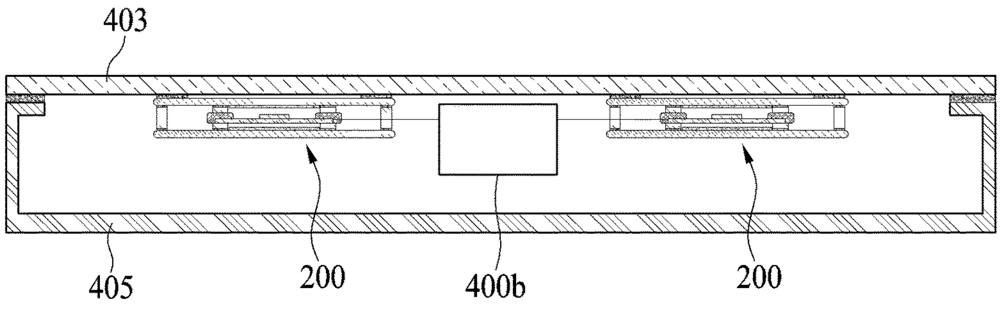
FIG. 39 is a diagram illustrating an apparatus according to a second aspect of the present disclosure.

FIG. 39 is a diagram illustrating an apparatus according to a second aspect of the present disclosure. FIG. 39 is a schematic diagram illustrating an apparatus including an amplifier board 400*b* and a vibration apparatus 200 connected to the amplifier board 400*b*.

In that the apparatus according to the second aspect of the present disclosure includes a plurality of vibration apparatuses 200, the apparatus according to the second aspect of the present disclosure may differ from the apparatus illustrated in FIG. 38, and the other elements may be the same.

The plurality of vibration apparatus 200 may be attached on (or connected to) the vibration member 403 to have a predetermined interval. The plurality of vibration apparatuses 200 may vibrate based on a signal amplified and supplied by the amplifier board 400*b* to generate a sound and may transfer a generated vibration to the vibration member 403, and thus, may vibrate the vibration member 403 to generate a sound. The apparatus according to the second aspect of the present disclosure may include two or more vibration apparatuses 200, and thus, may generate or output a surround sound or a stereo sound of two or more channels. For example, the apparatus illustrated in FIG. 39 may include the two vibration apparatuses 200, and thus, may generate or output a two-channel stereo sound.

As described above, according to the second aspect of the present disclosure, a sound pressure level and sound quality of a sound generated by a sound generator may be enhanced, thereby providing a sound apparatus having enhanced sound quality and sound pressure level. Also, according to the second aspect of the present disclosure, a sound having enhanced sound quality may be generated or output from a vibration plate disposed on both surfaces of the sound generator, thereby providing an apparatus or a sound apparatus having enhanced sound quality and sound pressure level.

A sound generator, a sound apparatus and an apparatus comprising the same according to the present disclosure will be described below.

A sound generator according to an aspect of the present disclosure may include a vibration plate; a first piezoelectric device which is disposed at the vibration plate and includes a first electrode, a first piezoelectric layer on the first electrode, a second electrode on the first piezoelectric layer, a second piezoelectric layer on the second electrode, and a third electrode on the second piezoelectric layer; a second piezoelectric device which is disposed on the first piezoelectric device to be perpendicular to the first piezoelectric device and includes a first electrode, a first piezoelectric layer on the first electrode, a second electrode on the first piezoelectric layer, a second piezoelectric layer on the second electrode, and a third electrode on the second piezoelectric layer; and at least one elastic supporting portion disposed at a vibration plate to support the first piezoelectric device and the second piezoelectric device.

According to some aspects of the present disclosure, the sound generator may further include at least two elastic supporting portions disposed at the second electrode of each of the first piezoelectric device and the second electrode of the second piezoelectric device.

According to some aspects of the present disclosure, the second electrode of each of the first piezoelectric device and the second piezoelectric device may include an extension portion which is longer than the first electrode, the first piezoelectric layer, the second piezoelectric layer, and the third electrode.

According to some aspects of the present disclosure, the at least one elastic supporting portion may be disposed between the extension portion of the first piezoelectric device and the vibration plate and between the extension portion of the second piezoelectric device and the vibration plate.

According to some aspects of the present disclosure, the second electrode of each of the first piezoelectric device and the second piezoelectric device may include a fourth electrode, a fifth electrode, at least one weight member disposed between the fourth electrode and the fifth electrode, and an adhesive layer disposed between the fourth electrode and the fifth electrode.

A sound apparatus according to an aspect of the present disclosure may include: a sound generator including: a back cover plate; a first piezoelectric device which is disposed at the back cover plate and includes a first electrode, a first piezoelectric layer on the first electrode, a second electrode on the first piezoelectric layer, a second piezoelectric layer on the second electrode, and a third electrode on the second piezoelectric layer; and a second piezoelectric device which is disposed at the first piezoelectric device to be perpendicular to the first piezoelectric device and includes a first electrode, a first piezoelectric layer on the first electrode, a second electrode on the first piezoelectric layer, a second piezoelectric layer on the second electrode, and a third electrode on the second piezoelectric layer; a front cover plate disposed at the sound generator; at least one side cover plate disposed between the back cover plate and the front cover plate; and at least one elastic supporting portion disposed between the second electrode of the first piezoelectric device and the back cover plate and between the second electrode of the second piezoelectric device and the back cover plate. The second electrode of each of the first piezoelectric device and the second piezoelectric device may include an extension portion which is longer than the first electrode, the first piezoelectric layer, the second piezoelectric layer, and the third electrode. The at least one elastic supporting portion may be disposed between the extension portion of the second electrode of the first piezoelectric device and the back cover plate and between the extension portion of the second electrode of the second piezoelectric device and the back cover plate.

According to some aspects of the present disclosure, the sound apparatus may further include an absorption member disposed between the back cover plate and the sound generator and between the front cover plate and the sound generator.

According to some aspects of the present disclosure, the sound apparatus may further include at least one weight member at the extension portion of each of the first piezoelectric device and the second piezoelectric device.

A sound apparatus according to an aspect of the present disclosure may include a sound generator including: first and second piezoelectric devices having a rectangular shape having a long-side direction and a short-side direction and vibrating based on a sound signal input thereto; and a sound generator including an elastic supporting portion which is connected to a main surface of each of the first and second piezoelectric devices and connects a portion of each of the first and second piezoelectric devices to a vibration plate to transfer a vibration of each of the first and second piezoelectric devices to the vibration plate. A long-side direction of the first piezoelectric device may differ from a long-side direction of the second piezoelectric device, and at least a portion of the first piezoelectric device may overlap at least a portion of the second piezoelectric device. Each of the first and second piezoelectric devices may include a first piezoelectric layer, a second piezoelectric layer, a first electrode, a second electrode, and a third electrode, the first electrode and the second electrode may support the first piezoelectric layer, and the second electrode and the third electrode may support the second piezoelectric layer. The second electrode may include a portion which more extends than the first piezoelectric layer, the second piezoelectric layer, the first electrode, and the third electrode in a long-side direction. The sound generator may further include an elastic member which is provided at the extended portion of the second electrode of each of the first and second piezoelectric layers to extend in at least a short-side direction. The elastic member may be configured so that a displacement width of each of the first and second piezoelectric devices increases based on a mass of both ends of the increased piezoelectric device.

According to some aspects of the present disclosure, the piezoelectric device may vibrate to be flexural in a thickness direction.

According to some aspects of the present disclosure, the elastic supporting portion may be connected to an end portion in a long-side direction.

According to some aspects of the present disclosure, the elastic supporting portion may be connected to a portion overlapping the first piezoelectric device and the second piezoelectric device.

According to some aspects of the present disclosure, the elastic member may be spaced apart from the first and second piezoelectric devices at a portion where the first piezoelectric device overlaps the second piezoelectric device.

A sound apparatus according to an aspect of the present disclosure may include a sound generator including: first and second piezoelectric devices having a rectangular shape having a long-side direction and a short-side direction and vibrating based on a sound signal input thereto; and a sound generator including a plurality of elastic supporting portions which are connected to a main surface of each of the first and second piezoelectric devices and connects a portion of each of the first and second piezoelectric devices to two vibration plates to transfer vibrations of the first and second piezoelectric devices to each of a plurality of vibration plates. A long-side direction of the first piezoelectric device may differ from a long-side direction of the second piezoelectric device, and at least a portion of the first piezoelectric device may overlap at least a portion of the second piezoelectric device. An element increasing a mas may be provided at both ends of the first and second piezoelectric devices in the long-side direction, and a displacement width of each of the first and second piezoelectric devices may increase based on an increased mass of both ends of the first and second piezoelectric devices. Each of a plurality of elastic supporting portions may be connected to an end portion of the first and second piezoelectric devices in the long-side direction.

According to some aspects of the present disclosure, the vibration plate may include an external protection member having lower elasticity than elasticity of the elastic member, and the elastic member may be supported between adjacent external protection members.

A sound apparatus according to some aspects of the present disclosure may comprise a vibration plate; a vibration portion including a first vibration device and a second vibration device disposed at a rear surface of the vibration plate to intersect with each other; and a connection portion connected between the vibration plate and the vibration portion, each of the first vibration device and the second vibration device may comprise a plurality of piezoelectric layers; and a common electrode disposed between the plurality of piezoelectric layers and including at least one weight member.

According to some aspects of the present disclosure, the connection portion may comprise a first supporting portion connected between the vibration plate and both end portions of the first vibration device in a long-side direction thereof; and a second supporting portion connected between the vibration plate and both end portions of the second vibration device in a long-side direction thereof.

According to some aspects of the present disclosure, the first supporting portion may be connected between the vibration plate and both end portions of the common electrode of the first vibration device, and the second supporting portion may be connected between the vibration plate and both end portions of the common electrode of the second vibration device.

According to some aspects of the present disclosure, each of the first vibration device and the second vibration device may comprise a first electrode; a first piezoelectric layer on the first electrode; a second electrode on the first piezoelectric layer; a second piezoelectric layer on the second electrode; and a third electrode on the second piezoelectric layer, and the second electrode of each of the first vibration device and the second vibration device may be the common electrode and comprises an extension portion extending long than the first electrode, the first piezoelectric layer, the second piezoelectric layer, and the third electrode.

According to some aspects of the present disclosure, the at least one weight member may be disposed at the extension portion.

According to some aspects of the present disclosure, each of the first vibration device and the second vibration device may comprise at least one concave portion formed at the extension portion of the second electrode, and the at least one weight member may be disposed in the at least one concave portion.

According to some aspects of the present disclosure, the at least one concave portion may be formed at at least one of an upper portion and a lower portion of the extension portion.

According to some aspects of the present disclosure, the second electrode of each of the first vibration device and the second vibration device may further comprise at least one second weight member disposed at a center in a thickness direction of the extension portion.

According to some aspects of the present disclosure, the second electrode of each of the first vibration device and the second vibration device may further comprise at least one second weight member disposed at a center in a thickness direction of the extension portion, and the at least one second weight member may be connected to the at least one weight member.

According to some aspects of the present disclosure, the second electrode of each of the first vibration device and the second vibration device may further comprise at least one second weight member disposed at a center in a thickness direction of the extension portion, and the at least one second weight member may overlap at least a portion of the connection portion or overlaps a whole top surface of the connection portion.

According to some aspects of the present disclosure, each of the first vibration device and the second vibration device may comprise a first electrode; a first piezoelectric layer on the first electrode; a second electrode on the first piezoelectric layer; a second piezoelectric layer on the second electrode; and a third electrode on the second piezoelectric layer, the second electrode of each of the first vibration device and the second vibration device may be the common electrode, and the at least one weight member may be disposed at a center in a thickness direction of the second electrode, in each of the first vibration device and the second vibration device.

According to some aspects of the present disclosure, the at least one weight member disposed at the first vibration device may overlap at least a portion of the second vibration device.

According to some aspects of the present disclosure, the connection portion may be connected between the vibration plate and the first electrode of each of the first vibration device and the second vibration device.

According to some aspects of the present disclosure, the connection portion may comprise a first supporting portion connected between the vibration plate and both end portions of the first electrode of the first vibration device; and a second supporting portion connected between the vibration plate and both end portions of the first electrode of the second vibration device.

According to some aspects of the present disclosure, the connection portion may overlap all of the first electrode of the second vibration device.

According to some aspects of the present disclosure, the connection portion may be connected between the vibration plate and a center portion of the first electrode of the first vibration device.

According to some aspects of the present disclosure, the second electrode of each of the first piezoelectric device and the second piezoelectric device may comprise a fourth electrode; a fifth electrode; and an adhesive layer between the fourth electrode and the fifth electrode, and the at least one weight member may be surrounded by the adhesive layer, between the fourth electrode and the fifth electrode.

According to some aspects of the present disclosure, the at least one weight member may be disposed at at least one of a center portion and both end portions of the second electrode in a long-side direction thereof.

A sound generator according to some aspects of the present disclosure may comprise a vibration plate; a vibration portion including a first vibration device and a second vibration device disposed on a rear surface of the vibration plate to intersect with each other; and a connection portion connected between the vibration plate and the vibration portion, each of the first vibration device and the second vibration device may comprise at least one piezoelectric layer; at least one weight member disposed near the at least one piezoelectric layer; and an adhesive layer fixing the at least one weight member.

According to some aspects of the present disclosure, each of the first vibration device and the second vibration device may comprise a first piezoelectric layer and a second piezoelectric layer between a first protection member and a second protection member; and a first electrode layer and a second electrode layer between the first piezoelectric layer and the second piezoelectric layer, and the at least one weight member and the adhesive layer may be between the first electrode layer and the second electrode layer.

According to some aspects of the present disclosure, each of the first vibration device and the second vibration device may comprise an electrode layer; a piezoelectric layer on the electrode layer; and a protection member on the piezoelectric layer, and the at least one weight member and the adhesive layer may be between the piezoelectric layer and the protection member.

According to some aspects of the present disclosure, each of the first vibration device and the second vibration device may comprise an electrode layer; a protection member on the electrode layer; a piezoelectric layer between the electrode layer and the protection member; and two weight members disposed between the electrode layer and the protection member and connected to both ends of the piezoelectric layer through the adhesive layer.

According to some aspects of the present disclosure, each of the first vibration device and the second vibration device may further comprise at least one another weight member between the piezoelectric layer and the protection member; and another adhesive layer disposed between each of the two weight members and the protection member and between the piezoelectric layer and the protection member to surround the at least one another weight member.

According to some aspects of the present disclosure, each of the first vibration device and the second vibration device may comprise a first piezoelectric layer and a second piezoelectric layer between a first protection member and a second protection member; and an electrode layer between the first piezoelectric layer and the second piezoelectric layer, the at least one weight member may be connected to an outer portion of the first protection member through the adhesive layer, and the second vibration device may connected to the at least one weight member connected to the first vibration device.

According to some aspects of the present disclosure, each of the first vibration device and the second vibration device may comprise an electrode layer; a piezoelectric layer on the electrode layer; and a protection member on the piezoelectric layer, the at least one weight member may be connected to an outer portion of the protection member through the adhesive layer, and the second vibration device may be connected to the at least one weight member connected to the first vibration device.

According to some aspects of the present disclosure, each of the first vibration device and the second vibration device may comprise an electrode layer; a piezoelectric layer on the electrode layer; a protection member on the piezoelectric layer; and two weight members connected to both ends of the piezoelectric layer through the adhesive layer, and each of the two weight members may be further connected to a periphery portion of the electrode layer through another adhesive layer.

According to some aspects of the present disclosure, each of the first vibration device and the second vibration device may comprise an electrode layer; a piezoelectric layer on the electrode layer; a protection member on the piezoelectric layer; two weight members disposed between the electrode layer and the protection member and connected to both ends of the piezoelectric layer through the adhesive layer; and at least one another weight member connected to an outer portion of the protection member, each of the two weight members may be further connected to a periphery portion of the electrode layer through another adhesive layer, and the second vibration device may be connected to the at least one another weight member connected to the first vibration device.

According to some aspects of the present disclosure, the connection portion may comprise a first supporting portion connected between the vibration plate and both end portions of the first vibration device; and a second supporting portion connected between the vibration plate and both end portions of the second vibration device.

According to some aspects of the present disclosure, the sound generator may further comprise at least one weight member between the connection portion and each of the first vibration device and the second vibration device.

A sound apparatus according to some aspects of the present disclosure may comprise a first cover, a second cover, and a sound generator disposed between the first cover and the second cover, the sound generator may comprise a vibration portion including a first vibration device and a second vibration device disposed to intersect with each other; and a connection portion connected between the vibration portion and each of the first cover and the second cover, and each of the first vibration device and the second vibration device may comprise a plurality of piezoelectric layers; and a common electrode disposed between the plurality of piezoelectric layers and including at least one weight member.

According to some aspects of the present disclosure, each of the first vibration device and the second vibration device may comprise a first electrode; a first piezoelectric layer on the first electrode; a second electrode on the first piezoelectric layer; a second piezoelectric layer on the second electrode; and a third electrode on the second piezoelectric layer, the second electrode of each of the first vibration device and the second vibration device may be the common electrode and comprises an extension portion extending long than the first electrode, the first piezoelectric layer, the second piezoelectric layer, and the third electrode, and the extension portion of the second electrode may connected to the connection portion in each of the first vibration device and the second vibration device.

According to some aspects of the present disclosure, the connection portion may comprise a first supporting portion connected between each of the first cover and the second cover and the extension portion of the second electrode of the first vibration device; and a second supporting portion connected between each of the first cover and the second cover and the extension portion of the second electrode of the second vibration device.

According to some aspects of the present disclosure, each of the first vibration device and the second vibration device may comprise at least one concave portion formed at the extension portion of the second electrode, and the at least one weight member may be disposed in the at least one concave portion.

According to some aspects of the present disclosure, the second electrode of each of the first vibration device and the second vibration device may further comprise at least one second weight member disposed at a center in a thickness direction of the extension portion.

According to some aspects of the present disclosure, the second electrode of each of the first vibration device and the second vibration device may further comprise at least one second weight member disposed at a center in a thickness direction of the extension portion, and the at least one second weight member may be connected to the at least one weight member.

According to some aspects of the present disclosure, the second electrode of each of the first vibration device and the second vibration device may further comprise at least one second weight member disposed at a center in a thickness direction of the extension portion, and the at least one second weight member may overlap at least a portion of the connection portion or overlaps a whole top surface of the connection portion.

According to some aspects of the present disclosure, the second electrode of each of the first piezoelectric device and the second piezoelectric device may comprise a fourth electrode; a fifth electrode; and an adhesive layer between the fourth electrode and the fifth electrode, and the at least one weight member may be surrounded by the adhesive layer, between the fourth electrode and the fifth electrode.

According to some aspects of the present disclosure, the sound apparatus may further comprise an absorption member disposed between the first cover and the sound generator and between the second cover and the sound generator.

According to some aspects of the present disclosure, at least one of the first cover and the second cover may comprise a first external protection member; a second external protection member; and an elastic portion disposed between the first external protection member and the second external protection member.

According to some aspects of the present disclosure, each of the first external protection member and the second external protection member may have elasticity which is lower than elasticity of the elastic portion.

According to some aspects of the present disclosure, the sound apparatus may further comprise a vibration member; and a case connected to the vibration member to surround the sound generator, the first cover may be connected to the vibration member through an adhesive portion.

An apparatus according to some aspects of the present disclosure may comprise a vibration member; a vibration apparatus connected to the vibration member; and a case connected to the vibration member to surround the sound apparatus, the vibration apparatus may comprise a sound generator, the sound apparatus comprises a vibration plate; a vibration portion including a first vibration device and a second vibration device disposed at a rear surface of the vibration plate to intersect with each other; and a connection portion connected between the vibration plate and the vibration portion, each of the first vibration device and the second vibration device comprises a plurality of piezoelectric layers; and a common electrode disposed between the plurality of piezoelectric layers and including at least one weight member.

According to some aspects of the present disclosure, the vibration member may be a vibration plate including a plastic material, a paper material, or a glass material, or may be a display panel including a plurality of pixels for displaying an image.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A sound generator, comprising:
- a vibration plate;
- a vibration portion including a first vibration device and a second vibration device disposed at a rear surface of the vibration plate that intersect with each other; and
- a connection portion connected between the vibration plate and the vibration portion,
- wherein each of the first vibration device and the second vibration device includes a plurality of piezoelectric layers and a common electrode disposed between the plurality of piezoelectric layers and including at least one weight member.

2. The sound generator of claim 1, wherein the connection portion comprises:
- a first supporting portion connected between the vibration plate and both end portions of the first vibration device in a long-side direction thereof; and

- a second supporting portion connected between the vibration plate and both end portions of the second vibration device in a long-side direction thereof.

3. The sound generator of claim 2, wherein the first supporting portion is connected between the vibration plate and the both end portions of the common electrode of the first vibration device, and
- wherein the second supporting portion is connected between the vibration plate and the both end portions of the common electrode of the second vibration device.

4. The sound generator of claim 1, wherein each of the first vibration device and the second vibration device comprises:
- a first electrode;
- a first piezoelectric layer disposed on the first electrode;
- a second electrode disposed on the first piezoelectric layer;
- a second piezoelectric layer disposed on the second electrode; and
- a third electrode disposed on the second piezoelectric layer, and
- wherein the second electrode of each of the first vibration device and the second vibration device is the common electrode and comprises an extension portion extending long than the first electrode, the first piezoelectric layer, the second piezoelectric layer, and the third electrode.

5. The sound generator of claim 4, wherein the at least one weight member is disposed at the extension portion.

6. The sound generator of claim 4, wherein each of the first vibration device and the second vibration device comprises at least one concave portion at the extension portion of the second electrode, and
- wherein the at least one weight member is disposed in the at least one concave portion.

7. The sound generator of claim 6, wherein the at least one concave portion is formed at at least one of an upper portion and a lower portion of the extension portion.

8. The sound generator of claim 5, wherein the second electrode of each of the first vibration device and the second vibration device further comprises at least one second weight member disposed at a center in a thickness direction of the extension portion.

9. The sound generator of claim 6, wherein the second electrode of each of the first vibration device and the second vibration device further comprises at least one second weight member disposed at a center in a thickness direction of the extension portion, and
- wherein the at least one second weight member is connected to the at least one weight member.

10. The sound generator of claim 1, wherein each of the first vibration device and the second vibration device comprises:
- a first electrode;
- a first piezoelectric layer on the first electrode;
- a second electrode on the first piezoelectric layer;
- a second piezoelectric layer on the second electrode; and
- a third electrode on the second piezoelectric layer,
- wherein the second electrode of each of the first vibration device and the second vibration device is the common electrode, and
- wherein the at least one weight member is disposed at a center in a thickness direction of the second electrode, in each of the first vibration device and the second vibration device.

11. The sound generator of claim 10, wherein the connection portion is connected between the vibration plate and the first electrode of each of the first vibration device and the second vibration device.

12. The sound generator of claim 10, wherein the connection portion comprises:

a first supporting portion connected between the vibration plate and both end portions of the first electrode of the first vibration device; and a second supporting portion connected between the vibration plate and both end portions of the first electrode of the second vibration device.

13. The sound generator of claim 10, wherein the connection portion overlaps with the first vibration device and the second vibration device.

14. The sound generator of claim 10, wherein the connection portion is connected between the vibration plate and a center portion of the first electrode of the first vibration device.

15. An apparatus, comprising:

a vibration member;

a vibration apparatus connected to the vibration member; and a case connected to the vibration member to surround the sound apparatus, wherein the vibration apparatus comprises the sound generator including:

a vibration plate;

a vibration portion including a first vibration device and a second vibration device disposed at a rear surface of the vibration plate that intersect with each other; and a connection portion connected between the vibration plate and the vibration portion, wherein each of the first vibration device and the second vibration device includes a plurality of piezoelectric layers and a common electrode disposed between the plurality of piezoelectric layers and including at least one weight member.

16. The apparatus of claim 15, wherein the vibration member is a vibration plate including a plastic material, a paper material, or a glass material, or is a display panel including a plurality of pixels configured to display an image.

* * * * *